(12) United States Patent
Ishihara et al.

(10) Patent No.: US 9,441,139 B2
(45) Date of Patent: Sep. 13, 2016

(54) PROCESS FOR PRODUCING SILICA-BASED FINE PARTICLE DISPERSION SOLS, SILICA-BASED FINE PARTICLE DISPERSION SOL, COATING COMPOSITION CONTAINING THE DISPERSION SOL, CURABLE COATING FILM, AND SUBSTRATE HAVING THE CURABLE COATING FILM

(71) Applicant: JGC Catalysts and Chemicals Ltd., Kawasaki-shi (JP)

(72) Inventors: Yoichi Ishihara, Kitakyushu (JP); Hiroyasu Nishida, Kitakyushu (JP)

(73) Assignee: JGC CATALYSTS AND CHEMICALS LTD., Kawasaki-shi (JP)

( * ) Notice: Subject to any disclaimer, the term of this patent is extended or adjusted under 35 U.S.C. 154(b) by 0 days.

(21) Appl. No.: 14/692,110

(22) Filed: Apr. 21, 2015

(65) Prior Publication Data
US 2015/0225609 A1 Aug. 13, 2015

Related U.S. Application Data

(62) Division of application No. 13/379,878, filed as application No. PCT/JP2010/060066 on Jun. 15, 2010, now Pat. No. 9,039,828.

(30) Foreign Application Priority Data

Jun. 24, 2009 (JP) .................................. 2009-149656
Dec. 19, 2009 (JP) .................................. 2009-288525

(51) Int. Cl.

| C08K 3/36 | (2006.01) |
|---|---|
| C09D 183/04 | (2006.01) |
| C01B 33/141 | (2006.01) |
| C09C 1/30 | (2006.01) |
| C09D 7/12 | (2006.01) |
| C09D 183/02 | (2006.01) |
| C09D 183/14 | (2006.01) |
| C01B 33/145 | (2006.01) |
| B82Y 30/00 | (2011.01) |
| C09D 133/00 | (2006.01) |
| C09D 163/00 | (2006.01) |
| C09D 167/00 | (2006.01) |
| C09D 175/04 | (2006.01) |
| C09D 179/04 | (2006.01) |
| C08G 77/58 | (2006.01) |
| C08K 9/02 | (2006.01) |

(52) U.S. Cl.
CPC ............ *C09D 183/04* (2013.01); *B82Y 30/00* (2013.01); *C01B 33/141* (2013.01); *C01B 33/145* (2013.01); *C09C 1/3054* (2013.01); *C09D 7/1225* (2013.01); *C09D 7/1266* (2013.01); *C09D 133/00* (2013.01); *C09D 163/00* (2013.01); *C09D 167/00* (2013.01); *C09D 175/04* (2013.01); *C09D 179/04* (2013.01); *C09D 183/02* (2013.01); *C09D 183/14* (2013.01); *C01P 2004/32* (2013.01); *C01P 2004/64* (2013.01); *C08G 77/58* (2013.01); *C08K 3/36* (2013.01); *C08K 9/02* (2013.01)

(58) Field of Classification Search
CPC .... C09D 183/04; C09D 175/04; C08K 3/36; C01P 2004/60; C01P 2004/64
See application file for complete search history.

(56) References Cited

U.S. PATENT DOCUMENTS

| 2,892,797 | A | 6/1959 | Alexander et al. |
|---|---|---|---|
| 4,451,388 | A | 5/1984 | Payne |
| 5,977,021 | A | 11/1999 | Aoyama et al. |
| 6,083,314 | A | 7/2000 | Nakashima et al. |
| 6,277,476 | B1 * | 8/2001 | Shaw-Klein ............ B41M 5/52 106/31.65 |
| 6,455,154 | B1 | 9/2002 | Nakashima et al. |
| 7,169,261 | B2 | 1/2007 | Persson et al. |
| 2002/0106512 | A1 * | 8/2002 | Nakamura ........... G03G 9/1075 428/404 |
| 2003/0180483 | A1 | 9/2003 | Fruge et al. |
| 2005/0158488 | A1 * | 7/2005 | Oiwamoto ........... B41M 5/5218 428/32.37 |
| 2005/0228057 | A1 | 10/2005 | Nyander et al. |
| 2006/0112860 | A1 * | 6/2006 | Yoshitake .............. B82Y 30/00 106/490 |
| 2007/0186484 | A1 | 8/2007 | Yamashita et al. |
| 2007/0240614 | A1 * | 10/2007 | Lynch ................. C08G 59/5026 106/287.14 |
| 2010/0294168 | A1 | 11/2010 | Sun et al. |

FOREIGN PATENT DOCUMENTS

| CN | 1934032 A | 3/2007 |
|---|---|---|
| JP | 58110415 A | 7/1983 |
| JP | 63123807 A | 5/1988 |
| JP | 06199515 A | 7/1994 |
| JP | 085657 B2 | 1/1996 |
| JP | 11061043 A | 3/1999 |
| JP | 2004203683 A | 7/2004 |

(Continued)

*Primary Examiner* — Pegah Parvini
(74) *Attorney, Agent, or Firm* — The Webb Law Firm

(57) ABSTRACT

Provided are silica-based fine particle dispersion sols, processes for producing the sols, coating compositions containing the dispersion sol, curable coating films obtained from the coating composition, and substrates having the coating film. The process including (1) mixing an aqueous aluminate solution to an alkaline silica sol which contains water-dispersible silica fine particles in a given ratio; (2) heating the mixture liquid obtained in step (1) to 60 to 200° C. and stirring the mixture liquid at the temperature for 0.5 to 20 hours; and (3) contacting the mixture liquid obtained in step (2) with a cation exchange resin to remove by ion exchange alkali metal ions contained in the mixture liquid and thereby controlling the pH of the mixture liquid to be in the range of 3.0 to 6.0.

9 Claims, No Drawings

(56) References Cited

FOREIGN PATENT DOCUMENTS

| JP | 2007214270 A | 8/2007 |
| JP | 2007277025 A | 10/2007 |
| WO | 2007111943 A2 | 10/2007 |
| WO | 2008111383 A1 | 9/2008 |

* cited by examiner

PROCESS FOR PRODUCING SILICA-BASED FINE PARTICLE DISPERSION SOLS, SILICA-BASED FINE PARTICLE DISPERSION SOL, COATING COMPOSITION CONTAINING THE DISPERSION SOL, CURABLE COATING FILM, AND SUBSTRATE HAVING THE CURABLE COATING FILM

CROSS-REFERENCE TO RELATED APPLICATIONS

This application is a divisional application of U.S. patent application Ser. No. 13/379,878 filed on Jun. 15, 2010 which is the U.S. national phase of PCT Application No. PCT/JP2010/060066 filed on Jun. 15, 2010 and claims priority to Japanese Patent Application No. JP 2009-149656 filed on Jun. 24, 2009 and Japanese Patent Application No. JP 2009-288525 filed on Dec. 19, 2009, the entire disclosures of which are incorporated herein by reference.

TECHNICAL FIELD

The present invention relates to a process for producing silica-based fine particle dispersion sols, and a silica-based fine particle dispersion sol. The invention further relates to a coating composition containing the dispersion sol, a curable coating film obtained from the coating composition, and a substrate having a curable coating film that is obtained by providing the coating film on a substrate.

BACKGROUND ART

Silica sols have been used in various fields as abrasives and functional inorganic fillers. The silica sols are stable in the alkaline region, but are instable and easily gelled in the acidic region.

However, there has been a demand for silica sols that are stable at an acidic pH in various fields including acidic abrasives, ceramic fiber materials and chromium surface treating agents.

Meanwhile, alkaline silica sols have another problem. That is, adding an alkaline silica sol to a coating composition which contains an organosilicon compound or a resin as a binder is likely to result in clouding or an increase in viscosity of the coating composition. Films that are obtained from such a coating composition show low transparency.

Thus, there has been a need for silica sols that are stable in the acidic region and can be stably added to a coating composition.

A known approach to improve the stability of a silica sol in the acidic region is to modify the surface of silica particles with aluminum.

For example, Patent Literature 1 discloses a silica sol having a pH of 4 to 5 that is produced by mixing a deionized acidic silica sol with an aqueous solution of acidic aluminum salts, and heating the mixture.

Further, Patent Literature 2 discloses a method for producing silica sols that are stable in the acidic to neutral region, by treating an aqueous silica sol solution having a pH of 6 or more with an ammonia or amine cation exchange resin, adding a metal aluminate, and heat treating the mixture at a temperature of not less than 70° C.

Patent Literature 3 discloses a method for producing silica sols that are stable at pH 5 to 12, by adding an aqueous solution containing a trace amount of aluminum salt to a silica sol.

Patent Literature 4 discloses a method in which an aluminum compound-containing alkaline silica sol is deionized with a cation exchange resin wherein the aluminum compound-containing alkaline silica sol is obtained by adding an acidic silicic acid solution and an aqueous aluminum compound solution to a $SiO_2$-containing aqueous alkali solution or aqueous alkali metal oxide solution, or by adding an acidic silicic acid solution which contains an aluminum compound to a $SiO_2$-containing aqueous alkali solution or aqueous alkali metal hydroxide solution.

Further, Patent Literature 5 discloses a method which includes adding an aqueous alkali aluminate solution to a silica sol which has a particle diameter of colloidal silica of 4 to 30 m$\mu$m, a pH of 2 to 9 and an aluminum content in terms of $Al_2O_3/SiO_2$ molar ratio of 0 to 0.0008 so as to achieve a $Al_2O_3/SiO_2$ molar ratio in the range of 0.0006 to 0.004; heat treating the mixture at 80 to 250° C. for 0.5 to 20 hours; and bringing the product into contact with a cation exchange resin, or a cation exchange resin and an anion exchange resin to produce an acidic silica sol having a pH of 2 to 5.

CITATION LIST

Patent Literatures

Patent Literature 1: U.S. Pat. No. 4,451,388
Patent Literature 2: JP-A-S58-110415
Patent Literature 3: U.S. Pat. No. 2,892,797
Patent Literature 4: JP-A-S63-123807
Patent Literature 5: JP-A-H06-199515

The silica sols described in Patent Literatures 1 and 2 achieve improved stability as a result of the surface of silica particles being coated with aluminum hydroxide or alumina. However, because the surface of such silica particles has a positive charge, aggregation occurs easily when the silica sol is mixed with an acidic organic compound, namely, an organic compound which has a negatively charged organic group such as the carboxyl group. Thus, there is a problem that the resulted coating composition shows low transparency.

In the silica sol of Patent Literature 3, the surface of the silica particles has a negative charge because of the surface structure in which aluminum has substituted for silicon. However, the pH at which the silica sol is stable ranges from 5 to 12. Thus, there has been a need for improvements in stability at a pH of below 5.

In the method for producing acidic silica sols according to Patent Literature 4, an acidic silicic acid solution and an aluminum compound are added to a $SiO_2$-containing aqueous alkali solution or aqueous alkali metal hydroxide solution. Accordingly, aluminum will be present both inside and on the surface of the silica particles. However, because aluminum inside the particles does not contribute to the stability of the silica particles, it is probable that the amount of surface charge of the silica particles is insufficient at times. Further, because the alkali metal will be contained inside the silica particles together with aluminum, such an alkali metal that has not been successfully removed is often eluted from the particles as a result of, for example, the passage of a long time depending on use conditions or storage conditions. Thus, the stability of the acidic silica sol is not sufficiently ensured.

According to the method described in Patent Literature 5, an aqueous alkali aluminate solution is added to a silica sol which has a particle diameter of colloidal silica of 4 to 30 m$\mu$m and a pH of 2 to 9 so as to obtain a $Al_2O_3/SiO_2$ molar ratio in the range of 0.0006 to 0.004. However, because the silica sol at a pH ranging from 3 to 9 is in an unstable state and further because the addition amount of aluminum is small, insufficient stability is often encountered when, for example, the acidic silica sol is concentrated to a high concentration. Although the silica sol at a pH ranging from 2 to 3 is in a semi-unstable state, the addition amount of the aqueous sodium aluminate solution that is as low as approximately 0.0006 to 0.004 in terms of $Al_2O_3/SiO_2$ molar ratio will probably cause insufficient stability when the silica sol is concentrated to a solid concentration of, for example, 30% by weight or more. Adding aluminum in an amount that gives a molar ratio of more than 0.004 often results in gelation.

Although the acidic silica sols that are obtained by the methods described in Patent Literatures 4 and 5 are stable in the acidic region, there has still been a need for silica sols which have higher stability, in particular excellent stability at a high concentration, and can be added to a coating composition while ensuring excellent performance of the resulted coating films.

In view of the problems in the art described above, it is an object of the present invention to provide silica-based fine particle dispersion sols that are stable at an acidic pH ranging from 3.0 to 6.0 and are excellent in properties such as stability and transparency with respect to a coating composition containing the sol and a coating film obtained from the coating composition. It is another object of the invention to provide such coating compositions, coating films, and substrates having the coating films.

SUMMARY OF THE INVENTION

An aspect of the present invention is directed to a process for producing a silica-based fine particle water dispersion sol that contains silica-based fine particles in which the surface of silica fine particles has been modified with aluminum, and has a pH in an acidic region from 3.0 to 6.0, the process including:

(1) a step of mixing an aqueous aluminate solution to an alkaline silica sol which contains water-dispersible silica fine particles and has a pH in the range of 9.0 to 11.5, in a ratio such that the $Al_2O_3/SiO_2$ molar ratio is 0.005 to 0.050 wherein a silicon component contained in the silica sol is represented by $SiO_2$ and aluminum contained in the aluminate is represented by $Al_2O_3$;

(2) a step of heating the mixture liquid obtained in the above step to a temperature of 60 to 200° C. and stirring the mixture liquid at the temperature for 0.5 to 20 hours; and (3) a step of contacting the mixture liquid obtained in the step (2) with a cation exchange resin to remove by ion exchange alkali metal ions contained in the mixture liquid and thereby controlling the pH of the mixture liquid to be in the range of 3.0 to 6.0.

The silica fine particles are preferably spherical particles having an average particle diameter in the range of 5 to 50 nm as measured by a BET method.

The silica fine particles are preferably chain particles having an average particle diameter in the range of 5 to 50 nm as calculated by the equation (L+D)/2 wherein L is the longitudinal length and D is the lateral length measured with respect to a transmission electron micrograph.

Preferably, the alkaline silica sol used in the step (1) contains alkali metal ions, and the $SiO_2/M_2O$ molar ratio is in the range of 20 to 300 wherein the alkali metal ions are represented by $M_2O$ (wherein M is the alkali metal element) and the silicon component contained in the silica sol is represented by $SiO_2$.

In the step (1), the aqueous aluminate solution is preferably mixed to the alkaline silica sol at an addition rate such that $Al_2O_3$ is added at $0.1 \times 10^{-2}$ g/hr to $40 \times 10^{-2}$ g/hr with respect to 1 g of $SiO_2$ wherein the silicon component contained in the alkaline silica sol is represented by $SiO_2$ and aluminum contained in the aqueous aluminate solution is represented by $Al_2O_3$.

The aluminate used in the step (1) is preferably sodium aluminate and/or potassium aluminate.

In the step (3), the mixture liquid is preferably contacted with the cation exchange resin at an elevated temperature of the mixture liquid in the range of 60 to 95° C.

The process preferably further includes, between the step (1) and the step (2):

(1.1) a step of heating the mixture liquid obtained in the step (1) to a temperature of 60 to 95° C. and stirring the mixture liquid at the temperature for 0.2 to 10 hours; and (1.2) a step of contacting the mixture liquid obtained in the step (1.1) with a cation exchange resin to remove by ion exchange at least part of the alkali metal ions contained in the mixture liquid and thereby controlling the pH of the mixture liquid to be in the range of 7 to 10.

The process preferably further includes a step of concentrating the silica-based fine particle dispersion sol obtained in the step (3).

A preferred aspect of the present invention is directed to a process for producing a silica-based fine particle organic solvent dispersion sol which includes a step of substituting the solvent of the silica-based fine particle water dispersion sol obtained by any of the above-described processes with an organic solvent, or a step of concentrating the silica-based fine particle water dispersion sol obtained by any of the above-described processes simultaneously with the solvent substitution.

The organic solvent used for the solvent substitution is preferably one, or two or more organic compounds selected from alcohols such as methanol, ethanol, butanol, propanol and isopropyl alcohol, ethers such as ethylene glycol monomethyl ether, propylene glycol monomethyl ether and propylene glycol monoethyl ether, and ketones such as methyl ethyl ketone and γ-butyrolactone.

A silica-based fine particle dispersion sol according to the present invention contains silica-based fine particles having a negative charge on the surface and has a pH in an acidic region from 3.0 to 6.0, wherein the surface of the silica-based fine particles has been modified with aluminum, and the amount of the modification by aluminum is in the range of $0.05 \times 10^{-6}$ to $2.0 \times 10^{-6}$ mol/m² in terms of $Al_2O_3$ per unit surface area of the silica-based fine particles.

The silica-based fine particles are preferably spherical particles having an average particle diameter in the range of 5 to 50 nm as measured by a BET method.

The silica-based fine particles are preferably chain particles having an average particle diameter in the range of 5 to 50 nm as calculated by the equation (L+D)/2 wherein L is the longitudinal length and D is the lateral length measured with respect to a transmission electron micrograph.

When the pH of the dispersion sol is 5.0, the amount of the negative charge on the surface of the silica-based fine particles is preferably in the range of 0.5 to 1.1 μeq/m² per specific surface area of the silica-based fine particles.

Preferably, at least part of aluminum that has modified the surface of the silica-based fine particles is in the form of a silica/alumina composite oxide represented by Formula (I) below:

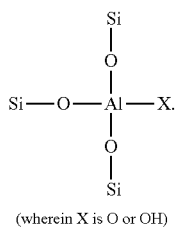

(wherein X is O or OH)

The solid concentration in the dispersion sol is preferably in the range of 5 to 60% by weight.

When the total content of the silica-based fine particles as solids contained in the dispersion sol and the silicon compound as a solute in the dispersion sol is 30% by weight in terms of oxide ($SiO_2$), the haze of the dispersion sol is preferably in the range of 0.5 to 20%.

The dispersion medium is preferably water and/or at least one organic compound selected from alcohols such as methanol, ethanol, butanol, propanol and isopropyl alcohol, ethers such as ethylene glycol monomethyl ether, propylene glycol monomethyl ether and propylene glycol monoethyl ether, and ketones such as methyl ethyl ketone and γ-butyrolactone.

A coating composition according to the present invention includes:

(A) at least one dispersion sol selected from silica-based fine particle water dispersion sols obtained by any of the aforementioned processes, silica-based fine particle organic solvent dispersion sols obtained by any of the aforementioned processes, and the above-described silica-based fine particle dispersion sols; and (B) a binder component.

The binder component is preferably an organosilicon compound represented by Formula (II) below and/or a hydrolysate thereof:

(wherein $R^1$ is a $C_{1-6}$ alkyl group, a $C_8$ or lower organic group having a vinyl group, a $C_8$ or lower organic group having an epoxy group, a $C_8$ or lower organic group having a methacryloxy group, a $C_{1-5}$ organic group having a mercapto group, or a $C_{1-5}$ organic group having an amino group; $R^2$ is a $C_{1-3}$ alkyl, alkylene, cycloalkyl, halogenated alkyl or allyl group; $R^3$ is a $C_{1-3}$ alkyl, alkylene or cycloalkyl group; a is an integer of 0 or 1; and b is an integer of 0, 1 or 2).

The binder component is preferably a thermosetting organic resin or a thermoplastic organic resin.

The thermosetting organic resin is preferably at least one selected from urethane resins, epoxy resins and melamine resins.

The thermoplastic organic resin is preferably at least one selected from acrylic resins, urethane resins and ester resins.

The coating composition is preferably an optical substrate coating composition.

The optical substrate coating composition is preferably a coating composition for forming a hardcoat layer.

A curable coating film according to the present invention is obtained by applying any of the above-described coating compositions onto a substrate.

A substrate having a curable coating film according to the present invention is obtained by providing the above curable coating film on a substrate.

According to the processes for producing silica-based fine particle dispersion sols of the invention, the surface of silica fine particles can be modified by aluminum in a markedly larger amount than heretofore possible in a way that the surface has a negative charge. The silica-based fine particle dispersion sols obtained by the inventive processes have very high dispersion stability in an acidic region, can be concentrated to a high concentration, and are excellent in transparency. The coating composition obtained by mixing the silica-based fine particle dispersion sol and a binder component is excellent in stability and transparency. The coating film obtained from the coating composition achieves high transparency as a result of the high dispersibility of the silica-based fine particles in the film as well as because of the high stability of the sol with respect to concentration. Further, the coating film has very high film hardness and scratch resistance, and is also excellent in adhesion, heat resistance and impact resistance.

DESCRIPTION OF THE INVENTION

The processes for producing silica-based fine particle dispersion sols according to the present invention will be described in greater detail hereinbelow.

Processes for Producing Silica-Based Fine Particle Water Dispersion Sols

A process for producing a silica-based fine particle water dispersion sol according to the invention is a process for producing a silica-based fine particle water dispersion sol that contains silica-based fine particles in which the surface of silica fine particles has been modified with aluminum, and has a pH in an acidic region from 3.0 to 6.0. The process includes:

(1) a step of mixing an aqueous aluminate solution to an alkaline silica sol which contains water-dispersible silica fine particles and has a pH in the range of 9.0 to 11.5, in a ratio such that the $Al_2O_3/SiO_2$ molar ratio is 0.005 to 0.050 wherein a silicon component contained in the silica sol is represented by $SiO_2$ and aluminum contained in the aluminate is represented by $Al_2O_3$;

(2) a step of heating the mixture liquid obtained in the above step to a temperature of 60 to 200° C. and stirring the mixture liquid at the temperature for 0.5 to 20 hours; and (3) a step of contacting the mixture liquid obtained in the step (2) with a cation exchange resin to remove by ion exchange alkali metal ions contained in the mixture liquid and thereby controlling the pH of the mixture liquid to be in the range of 3.0 to 6.0.

These steps in the process will be described in detail below.

Step (1)

In this step, an aqueous aluminate solution is mixed to an alkaline silica sol which contains water-dispersible silica fine particles and has a pH in the range of 9.0 to 11.5, in a ratio such that the $Al_2O_3/SiO_2$ molar ratio is 0.005 to 0.050 wherein a silicon component contained in the silica sol is represented by $SiO_2$ and aluminum contained in the aluminate is represented by $Al_2O_3$.

By performing this step, a precursor of a silica/alumina composite oxide is formed on the surface of the silica fine particles.

The silica fine particles contained in the alkaline silica sol are preferably dispersible in water. The use of silica fine particles that are not dispersed in water is unfavorable because the transparency of the resulted silica-based fine particle water dispersion sol is lowered.

Here, the phrase dispersible in water means that the silica fine particles are colloidal fine particles and are not precipitated in a solvent.

The pH of the alkaline silica sol is preferably in the range of 9.0 to 11.5, and more preferably 9.5 to 11.0. The pH of the alkaline silica sol in the range of 9.0 to 11.5 ensures that the solubility of silica is increased. Thus, when the alkaline silica sol is mixed with the aqueous aluminate solution, the silicic acid monomers present in the silica skeletons on the surface of the silica fine particles easily undergo substitution reaction with the aluminate ions. Because the silica sol with a pH of 9.0 to 11.5 has high solubility of silica, silica components which are dissolved as silicic acid monomers are present in the solvent. The presence of aluminate ions in the vicinity of such silica components results in a local decrease in solubility of silica, and a complex between the silicic acid monomer and the aluminate ion is precipitated as a precursor of a silica/alumina composite oxide on the surface of the silica fine particles. As a result of this reaction, a homogeneous precursor of a silica/alumina composite oxide is formed. The precursor is dehydrated, and condensation polymerized in the subsequent step whereby the surface of the silica fine particles can be homogeneously modified by aluminum in a markedly larger amount than heretofore possible in a way that the surface has a negative charge.

If the pH of the alkaline silica sol is greater than 7.0 and is less than 9.0, the solubility of silica is low and therefore the substitution reaction between the silicic acid monomers and the aluminate ions is less likely to take place. As a result, the aluminate ions contained in the aqueous aluminate solution are aggregated by solely forming hydroxides, thereby deteriorating the transparency and the stability of the silica-based fine particle dispersion sol. It is not desirable. If an acidic silica sol with a pH of 7.0 or below is used instead of the alkaline silica sol, the addition of the aqueous aluminate solution which is alkaline causes the acidic silica sol to experience a neutral pH region in which instability is encountered to undesirable result in gelation.

If the pH of the alkaline silica sol is in excess of 11.5, the solubility of silica becomes excessively high with the results that it is difficult for a silica/alumina composite oxide precursor to be formed on the surface of the silica fine particles, and that the denseness in the structure of the silica/alumina composite oxide is lowered. It is not desirable.

The silica fine particles are preferably spherical particles or chain particles.

The term spherical is defined to include spheres and approximate spheres.

The term chain is defined to include coupled particles in which two primary particles are coupled together.

The silica fine particles are preferably spherical particles having an average particle diameter in the range of 5 to 50 nm as measured by a BET method.

If the average particle diameter is less than 5 nm, the stability of the silica-based fine particle water dispersion sol is unpreferably lowered. An average particle diameter in excess of 50 nm is not favorable in some applications because the transparency of the silica-based fine particle water dispersion sol is deteriorated.

The use of such spherical particles described above ensures that the resulted coating composition has high stability and transparency and gives a coating film which has high film strength, scratch resistance and transparency.

The silica fine particles are also preferably chain particles having an average particle diameter in the range of 5 to 50 nm as calculated by the equation $(L+D)/2$ wherein L is the longitudinal length and D is the lateral length measured with respect to a transmission electron micrograph.

If the average particle diameter is less than 5 nm, the stability of the silica-based fine particle water dispersion sol is unpreferably lowered. An average particle diameter in excess of 50 nm is not favorable in some applications because the transparency of the silica-based fine particle water dispersion sol is deteriorated.

In the use of the chain silica fine particles, the chain particles form a strong network structure in the resulted coating film to further increase the film strength of the coating film. Further, the use of the chain silica fine particles is also advantageous in that the diffusion of the particles on the film surface during the film production is inhibited and the particles will not protrude from the film surface. That is, the resulted coating film achieves high surface smoothness and higher scratch resistance. Further, the chain silica particles are highly stable and therefore the sol is rarely gelled, thereby allowing for further improvements in the transparency of the resulted coating composition and that of the resulted coating film.

Further details of the shapes of the chain particles will be described. The chain particle is a secondary particle formed by 2 to 10, and more preferably 3 to 10 primary particles that are coupled together. The secondary particle preferably has a shorter diameter/longer diameter ratio in the range of 0.01 to 0.80. The chain particles preferably have an average particle diameter in the range of 7 to 200 nm as measured by a dynamic light scattering method. The shape variance (average particle diameter obtained by dynamic light scattering method/average particle diameter calculated by using BET method) is preferably in the range of 2 to 10.

The shape and the diameter of the primary particles are not particularly limited as long as the chain secondary particles satisfy the conditions described above.

The alkaline silica sol preferably contains alkali metal ions. The content of the alkali metal ions is preferably such that the $SiO_2/M_2O$ molar ratio is in the range of 20 to 300, and more preferably 30 to 200 wherein the alkali metal ions are represented by $M_2O$ (wherein M is the alkali metal element) and the silicon components contained in the alkaline silica sol are represented by $SiO_2$. If the molar ratio is less than 20, gelation can occur at the time of, for example, ion exchange. If the molar ratio exceeds 300, the solubility of silica is lowered and mixing the alkaline silica sol with the aqueous aluminate solution can possibly result in an unpreferable increase in viscosity or gelation.

In the case where the alkali metal ions contained in the silica sol are ion exchanged with amine ions or ammonium ions, the solubility of silica in such an alkaline silica sol is lowered and gelation can occur when the silica sol is mixed with the aqueous aluminate solution. It is not preferable.

The alkaline silica sol containing the spherical silica fine particles may be produced by a known method such as condensation polymerization of a silicic acid solution or liquid glass, or hydrolysis of alkoxysilane. Further, commercial products may be used, with examples including CATALOID SI-30, CATALOID SI-40 and CATALOID SI-50 manufactured by JGC Catalysts and Chemicals Ltd.

The alkaline silica sol containing the chain silica fine particles may be produced by, for example, a method in which an alkaline water dispersion sol of spherical particles having an average particle diameter of 5 to 17 nm according to a BET method is adjusted to a solid concentration of 1 to 15% by weight, then decationized to a pH in the range of 2 to 5 and heat treated at 60 to 250° C. for 0.5 to 24 hours, and thereafter an alkali is added thereto and the concentration is adjusted as required.

Other known methods such as those described in JP-B-H08-5657 and JP-A-H11-61043 may be adopted. In the case where the obtained sol of the chain silica particles is acidic or neutral, an alkali may be added thereto to control the pH to a desired value.

Depending on the process by which the silica sol is prepared, the silica sol may contain an aluminum component. In such a case, it is preferable that the silica sol has an aluminum content of less than 0.007 in terms of $Al_2O_3/SiO_2$ molar ratio. If the $Al_2O_3/SiO_2$ molar ratio is in excess of 0.007, the alkali content in the silica sol is so high that gelation can occur at the time of, for example, ion exchange.

The alkaline silica sol preferably has a solid concentration in terms of $SiO_2$ of 10 to 50% by weight. If this solid concentration is below 10% by weight, the productivity of the silica-based fine particles is lowered. Any concentration in excess of 50% by weight is not favorable because the viscosity of the alkaline silica sol is increased.

The amount of the aqueous aluminate solution that is mixed to the alkaline silica sol is preferably such that the $Al_2O_3/SiO_2$ molar ratio is 0.005 to 0.050, more preferably 0.007 to 0.050, and still more preferably 0.010 to 0.050 wherein the silicon components contained in the silica sol are represented by $SiO_2$ and aluminum contained in the aluminate is represented by $Al_2O_3$.

If this molar ratio is less than 0.005, the amount of the modification by aluminum with respect to the surface of the silica-based fine particles is small, resulting in a decrease in stability of the silica-based fine particle dispersion sol as well as a decrease in stability of the coating composition and a decrease in hardness, scratch resistance and transparency of the curable coating film. Any amount that gives a molar ratio in excess of 0.050 is not preferable because the stability and the transparency of the silica-based fine particle dispersion sol are lowered and the hardness, the scratch resistance and the transparency of the curable coating film are deteriorated.

The aqueous aluminate solution is preferably mixed to the alkaline silica sol at an addition rate such that $Al_2O_3$ is added at a rate of $0.1\text{-}10^{-2}$ g/hr to $40 \times 10^{-2}$ g/hr, and more preferably 1 to $30 \times 10^{-2}$ g/hr with respect to 1 g of $SiO_2$ wherein the silicon components contained in the alkaline silica sol are represented by $SiO_2$ and aluminum contained in the aqueous aluminate solution is represented by $Al_2O_3$.

The addition at a rate of less than $0.1\text{-}10^{-2}$ g/hr is not economical due to a long addition time. The addition at a rate in excess of $40 \times 10^{-2}$ g/hr is not preferable because the aggregation of silica or aluminum components can take place due to a local increase in pH or salt concentration, and also because the homogeneity of the silica/alumina composite oxide precursor can be lowered to deteriorate the stability of the silica-based fine particle dispersion sol.

The aluminate is preferably sodium aluminate and/or potassium aluminate.

The aqueous aluminate solution preferably has a solid concentration in terms of $Al_2O_3$ of 0.5 to 30% by weight.

If the concentration in terms of $Al_2O_3$ is less than 0.5% by weight, it is likely that the aluminate be hydrolyzed to form a hydroxide. If the concentration in excess of 30% by weight, the aggregation of silica or aluminum components can take place due to a local increase in pH or salt concentration. These are not preferable.

The aqueous aluminate solution preferably has a $M_2O/Al_2O_3$ molar ratio (wherein M is the alkali metal element) in the range of 1.0 to 1.5. If this molar ratio is less than 1.0, it is likely that the aluminate be hydrolyzed to form a hydroxide. Any molar ratio in excess of 1.5 can result in difficult formation of the silica/alumina composite oxide precursor. Further, the addition of the aqueous aluminate solution to the alkaline silica sol preferably takes place at a temperature of less than 60° C. If the temperature is more than 60° C., it is likely that the aluminate be hydrolyzed to form an aggregate such as hydroxide.

Step (2)

In this step, the mixture liquid obtained in the above-described step is heated to a temperature of 60 to 200° C. and stirred at the temperature for 0.5 to 20 hours.

The temperature is preferably in the range of 60 to 200° C., and more preferably 80 to 180° C.

In the event that the step (1) has not sufficiently completed the substitution reaction between the silicic acid monomers and the aluminate ions at the surface of the silica fine particles, or the precipitation reaction of the silica dissolved in the silica sol and the aluminate ions onto the surface of the silica fine particles, these substitution reaction and precipitation reactions are allowed to sufficiently take place by performing this step. Further, the silica/alumina composite oxide precursor that has been formed on the surface of the silica fine particles undergoes dehydration and condensation polymerization in this step and is thereby stabilized at the surface of the silica fine particles. As a result, the surface of the silica fine particles is modified with aluminum.

If the temperature for heating the mixture liquid is less than 60° C., the dehydration and the condensation polymerization of the silica/alumina composite oxide precursor do not proceed sufficiently, resulting in a decrease in stability of the silica-based fine particle dispersion sol and a decrease in capability of the silica-based fine particle dispersion sol to be stably concentrated to a high concentration. If the heating temperature exceeds 200° C., the solubility of silica is excessively increased to reduce the denseness in the structure of the silica/alumina composite oxide, possibly resulting in a decrease in stability of the silica-based fine particle dispersion sol and a decrease in capability of the silica-based fine particle dispersion sol to be stably concentrated to a high concentration.

The heating may be performed using a known apparatus and a known method. The heating may be carried out at atmospheric pressure or an increased pressure. When the heating is performed at an increased pressure by the use of, for example, an autoclave, the stability of the silica-based fine particle dispersion sol is further enhanced.

The stirring time is preferably in the range of 0.5 to 20 hours. If the stirring time is less than 0.5 hours, the dehydration and the condensation polymerization do not proceed sufficiently, possibly resulting in a decrease in stability of the silica-based fine particle dispersion sol. Stirring for more than 20 hours does not cause any technical problems, but is not economical due to the prolonged production time.

Step (3)

In this step, the mixture liquid obtained in the step (2) is contacted with a cation exchange resin to remove by ion exchange alkali metal ions contained in the mixture liquid and thereby to control the pH of the mixture liquid to be in the range of 3.0 to 6.0.

The pH is preferably in the range of 3.0 to 6.0, and more preferably 3.5 to 5.0.

If the pH is less than 3.0, part of the aluminum that has modified the surface of the silica-based fine particles is dissolved and is removed by ion exchange by the cation exchange resin, possibly resulting in a decrease in stability of the silica-based fine particle dispersion sol and a decrease in film hardness. If the pH is in excess of 6.0, the silica-based fine particle dispersion sol is destabilized and is often gelled.

The mixture liquid may be contacted with the cation exchange resin by a batch method (a resin circulation system), a column method (a resin-packed system) or any other known method. In the case of a batch method, stirring is preferably performed as required. The cation exchange may be carried out for a time that is appropriately controlled. In general, sufficient results can be obtained when the silica-based fine particle water dispersion sol is contacted with the cation exchange resin for 1 to 20 hours while performing stirring.

In the step (3), the mixture liquid may be heated so that the contact with the cation exchange resin will take place at a temperature of 60 to 95° C. The cation exchange under this temperature condition achieves higher effects in removing the alkali metal ions by ion exchange.

Through these steps (1) to (3), a silica-based fine particle water dispersion sol can be obtained which contains the silica-based fine particles in which the surface of the silica fine particles has been modified with aluminum, and has a pH in an acidic region from 3.0 to 6.0.

Preferably, the process further includes, between the step (1) and the step (2):

Step (1.1): a step of heating the mixture liquid obtained in the step (1) to a temperature of 60 to 95° C. and stirring the mixture liquid at the temperature for 0.2 to 10 hours; and Step (1.2): a step of contacting the mixture liquid obtained in the step (1.1) with a cation exchange resin to remove by ion exchange at least a part of the alkali metal ions contained in the mixture liquid and thereby controlling the pH of the mixture liquid to be in the range of 7 to 10.

Performing the steps (1.1) and (1.2) further increases the denseness in the structure of the silica/alumina composite oxide that will be formed on the surface of the silica fine particles. This also increases the hardness of the curable coating film. When the steps (1.1) and (1.2) are not performed, the silica components that have been dissolved in the solvent of the silica-based fine particle water dispersion sol often remain as such. Depending on the methods or conditions in the concentration or the solvent substitution, such components can lower the stability of the silica-based fine particle water dispersion sol when the sol is concentrated to a high concentration. By performing these additional steps, however, the silica components that have been dissolved in the solvent of the silica-based fine particle water dispersion sol can be completely precipitated as the silica/alumina composite oxide at the surface of the silica fine particles.

The steps (1.1) and (1.2) will be described in detail hereinbelow.

Step (1.1)

The mixture liquid obtained in the step (1) is heated to a temperature of 60 to 95° C. and stirred at the temperature for 0.2 to 10 hours.

By this step, the substitution reaction can proceed sufficiently between the silicic acid monomers and the aluminate ions at the surface of the silica fine particles.

Heating at a temperature of less than 60° C. is not preferable because there is a case that the substitution reaction does not complete sufficiently. If the heating temperature exceeds 95° C., the solubility of silica is so increased that the precipitation of silica in the subsequent step (1.2) does not take place adequately or the dehydration and the condensation polymerization for the silica/alumina composite oxide proceed excessively.

Stirring for less than 0.2 hour does not allow for sufficient formation of the precursor. Stirring for more than 10 hours is not economical due to the prolonged production time.

Step (1.2)

The mixture liquid obtained in the step (1.1) is contacted with a cation exchange resin to remove by ion exchange at least a part of the alkali metal ions contained in the mixture liquid and thereby the pH of the mixture liquid is controlled to be in the range of 7 to 10.

By this step, the solubility of silica in the mixture liquid is lowered with the result that the silica components that have been dissolved as the silicic acid monomers in the mixture liquid are precipitated as the silica/alumina composite oxide precursor on the surface of the silica fine particles.

The pH is preferably adjusted to be in the range of 7.0 to 10.0, and more preferably 7.0 to 9.5. The mixture liquid will be gelled at a pH of less than 7.0. Any pH value in excess of 10.0 is not preferable because it becomes difficult for the silica components dissolved in the mixture liquid to modify the surface of the silica fine particles in the form of the silica/alumina composite oxide.

The silica components that have been precipitated as the silica/alumina composite oxide precursor are not substantially dissolved again in the mixture liquid even when the mixture liquid is heated in the step (3) under conditions that causes an increase of the solubility of silica.

Performing these steps increases the denseness in the structure of the silica/alumina composite oxide, resulting in an improvement in the stability of the silica-based fine particle water dispersion sol when the sol is concentrated to a high concentration.

Methods for Concentrating Silica-Based Fine Particle Water Dispersion Sols, and Processes for Producing Silica-Based Fine Particle Organic Solvent Dispersion Sols The silica-based fine particle water dispersion sol obtained by the aforementioned steps may be concentrated as required by a known method such as ultrafiltration, evaporator concentration or evaporation.

Further, the dispersion medium of the silica-based fine particle water dispersion sol obtained by the aforementioned steps may be substituted with an organic solvent by a known method such as ultrafiltration or evaporator concentration, resulting in a silica-based fine particle organic solvent dispersion sol.

Examples of the organic solvents include alcohols such as methanol, ethanol, butanol, propanol and isopropyl alcohol, ethers such as ethylene glycol monomethyl ether, propylene glycol monomethyl ether and propylene glycol monoethyl ether, and ketones such as methyl ethyl ketone and γ-butyrolactone.

The solvent substitution with the organic solvent may be performed before or after the concentration step. In an embodiment, the silica-based fine particle dispersion sol may be concentrated and the solvent may be substituted simultaneously by the use of, for example, an ultrafiltration method or an evaporator.

In a preferred embodiment, at least one of the concentration step and the solvent substitution step adopts an ultrafiltration method. Ultrafiltration can remove silica that can possibly remain dissolved in the solvent of the silica-based fine particle water dispersion sol or the silica-based fine particle organic solvent dispersion sol. As a result, further improvements can be achieved in the stability and the transparency of the silica-based fine particle water dispersion sol or the silica-based fine particle organic solvent dispersion sol that is concentrated to a high concentration, as well as in the dispersibility of the silica fine particles in the curable coating film.

The solid concentration in the silica-based fine particle water dispersion sol or the silica-based fine particle organic solvent dispersion sol is preferably in the range of 5 to 60% by weight, and more preferably 20 to 50% by weight in terms of $SiO_2$. If the solid concentration is less than 5% by weight, the coating composition containing the dispersion sol will give a curable coating film having low hardness. Any solid concentration in excess of 60% by weight is not preferable because the stability of the dispersion sol is sometimes deteriorated.

As required, the silica-based fine particle water dispersion sol or the silica-based fine particle organic solvent dispersion sol may be subjected to surface treatment using a known surface treating agent such as a silane coupling agent.

Silica-Based Fine Particle Dispersion Sols

Next, the silica-based fine particle dispersion sols according to the invention will be described in detail.

The silica-based fine particle dispersion sol according to the present invention contains silica-based fine particles having a negative charge on the surface and has a pH in an acidic region from 3.0 to 6.0. The surface of the silica-based fine particles has been modified with aluminum, and the amount of the modification by aluminum is in the range of $0.05\times10^{-6}$ to $2.0\times10^{-6}$ $mol/m^2$ in terms of $Al_2O_3$ per unit surface area of the silica-based fine particles.

The silica-based fine particles are preferably spherical particles having an average particle diameter in the range of 5 to 50 nm as measured by a BET method.

If the average particle diameter is less than 5 nm, the stability of the silica-based fine particle dispersion sol may be lowered. An average particle diameter in excess of 50 nm is not favorable in some applications because the transparency of the silica-based fine particle dispersion sol is deteriorated.

The silica-based fine particles are also preferably chain particles having an average particle diameter in the range of 5 to 50 nm as calculated by the equation (L+D)/2 wherein L is the longitudinal length and D is the lateral length measured with respect to a transmission electron micrograph.

This average particle diameter indicates the particle diameter of chain secondary particles.

If the average particle diameter is less than 5 nm, the stability of the silica-based fine particle dispersion sol may be lowered. An average particle diameter in excess of 50 nm is not favorable in some applications because the transparency of the silica-based fine particle dispersion sol is deteriorated.

In the use of the chain silica-based fine particles, the chain particles forma strong network structure in the resulted coating film to further increase the film strength of the coating film. Further, the use of the chain silica-based fine particles is also advantageous in that the diffusion of the particles on the film surface during the film production is inhibited and the particles will not protrude from the film surface. That is, the resulted coating film achieves high surface smoothness and higher scratch resistance. Further, the chain silica particles are highly stable and therefore the sol is rarely gelled, thereby allowing for further improvements in the transparency of the resulted coating composition and that of the resulted coating film.

Further details of the shapes of the chain particles will be described. The chain particle is a secondary particle formed by 2 to 10, and more preferably 3 to 10 primary particles that are coupled together. The secondary particle preferably has a shorter diameter/longer diameter ratio in the range of 0.01 to 0.80. The chain particles preferably have an average particle diameter in the range of 7 to 200 nm as measured by a dynamic light scattering method. The shape variance (average particle diameter obtained by dynamic light scattering method/average particle diameter calculated by using BET method) is preferably in the range of 2 to 10.

The shape and the diameter of the primary particles are not particularly limited as long as the chain secondary particles satisfy the conditions described above.

The pH of the silica-based fine particles is preferably in the range of 3.0 to 6.0, and more preferably 3.5 to 5.0. If the pH is less than 3.0, the aluminum that has modified the surface of the silica-based fine particles is dissolved to decrease the stability of the silica-based fine particle dispersion sol. Any pH value in excess of 6.0 is not favorable because the silica-based fine particle dispersion sol is easily gelled.

The amount of the aluminum modifying the silica-based fine particles is preferably in the range of $0.05\times10^{-6}$ to $2.0\times10^{-6}$ $mol/m^2$, and more preferably $0.15\times10^{-6}$ to $1.8\times10^{-6}$ $mol/m^2$ in terms of $Al_2O_3$ per unit surface area of the silica-based fine particles. Any amount of modification that is less than $0.05\times10^{-6}$ $mol/m^2$ is not preferable because it results in a decrease in stability of the silica-based fine particle dispersion sol or a decrease in film strength of the curable coating film according to the invention. An amount of modification exceeding $2.0\times10^{-6}$ $mol/m^2$ is not preferable because the transparency or the stability of the silica-based fine particle dispersion sol can be lowered.

The silica-based fine particles preferably have a negative charge on the surface.

When the pH of the dispersion sol is 5.0, the amount of the negative charge on the surface of the silica-based fine particles is preferably in the range of 0.5 to 1.0 µeq/m², and more preferably 0.6 to 0.9 µeq/m² per specific surface area of the silica-based fine particles. If the amount of the negative charge is less than 0.5 µeq/m², the stability of the silica-based fine particle dispersion sol is lowered. If the amount of the negative charge is in excess of 1.0 µeq/m², the charge layer of the negative charge on the surface of the silica-based fine particles becomes so large that the stability of the dispersion sol is lowered.

Preferably, at least a part of aluminum that has modified the silica-based fine particles is in the form of a silica/alumina composite oxide that contains a crystal structure represented by Formula (I) below:

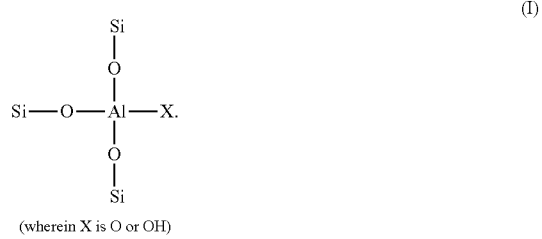

(wherein X is O or OH)

An alkali metal ion or a hydrogen ion may be present in the vicinity of Al in Formula (I). As a result of this configuration in which at least a part of aluminum has the structure of Formula (I) above, a negative charge is given on the surface of the silica-based fine particles.

In the present invention, the silica/alumina composite oxide is formed from the silicic acid monomers and the aluminate ions. Thus, the silica/alumina composite oxide of uniform composition that has the structure represented by Formula (I) above can be formed on the surface of the silica fine particles.

In the case where the aluminum that has modified the silica-based fine particles has such a structure as aluminum hydroxide or aluminum oxide instead of the structure including Formula (I), the homogeneity of the silica/alumina composite oxide will be lowered or the surface of the silica-based fine particles will have a positive charge. It is not preferable.

The solid concentration in the silica-based fine particle dispersion sol is preferably in the range of 5 to 60% by weight, and more preferably 20 to 50% by weight in terms of $SiO_2$. If the solid concentration is less than 5% by weight, the coating composition containing the dispersion sol will give a curable coating film having low hardness. Any solid concentration in excess of 60% by weight is not preferable because the stability of the dispersion sol may be deteriorated.

The haze of the silica-based fine particle dispersion sol varies in accordance with the concentration. When the solid concentration of the dispersion sol is 30% by weight in terms of $SiO_2$, the haze of the dispersion sol is preferably in the range of 0.5 to 20%. Achieving a haze of less than 0.5% at a solid concentration of 30% by weight requires at least that ultrafine particles having an average particle diameter of less than 5 nm be used. However, the use of such ultrafine particles increases the viscosity of the resulted silica-based fine particle dispersion sol and is thus not favorable. A haze in excess of 20% is sometimes unfavorable because it results in a decrease in transparency of the dispersion sol and that of the curable coating film which is obtained from the coating composition containing the dispersion sol.

The dispersion medium in the silica-based fine particle dispersion sol is preferably water and/or at least one organic compound selected from alcohols such as methanol, ethanol, butanol, propanol and isopropyl alcohol, ethers such as ethylene glycol monomethyl ether, propylene glycol monomethyl ether and propylene glycol monoethyl ether, and ketones such as methyl ethyl ketone and γ-butyrolactone.

The silica-based fine particle dispersion sol of the invention is preferably produced by any of the processes for producing silica-based fine particle water dispersion sols and the processes for producing silica-based fine particle organic solvent dispersion sols that are described in the specification.

The silica-based fine particles contained in the silica-based fine particle dispersion sol may have been surface treated using a known surface treating agent such as a silane coupling agent.

The silica-based fine particle dispersion sols according to the present invention are stable in an acidic region and thus can be used for ceramic fiber materials or binders, chromium surface treating agents, acidic abrasives, various coating materials, and fillers for resin compositions. Further, the silica-based fine particle dispersion sols have high dispersion stability in organic binders, as well as high transparency and film strength. Thus, the silica-based fine particle dispersion sols are particularly suited for use in coating materials for forming curable coating films such as hardcoat films.

Coating Compositions

Next, the coating compositions of the invention will be described.

The applications of the coating compositions according to the invention are not particularly limited, and include hardcoat materials, sealing materials, bonding materials, and fillers for resin compositions. Curable coating films obtained from the coating compositions of the present invention have high film strength, transparency and scratch resistance. Thus, the coating compositions of the invention are particularly suited for forming a hardcoat layer or a primer layer on the surface of an optical lens substrate.

The coating composition according to the present invention includes:

(A) at least one dispersion sol selected from the aforementioned silica-based fine particle dispersion sols according to the invention, silica-based fine particle water dispersion sols obtained by any of the aforementioned inventive processes for producing silica-based fine particle water dispersion sols, and silica-based fine particle organic solvent dispersion sols obtained by any of the aforementioned inventive processes for producing silica-based fine particle organic solvent dispersion sols; and (B) a binder component.

(A) Inventive Silica-Based Fine Particle Dispersion Sols

The silica-based fine particle dispersion sol that is the component (A) of the coating composition according to the invention is a dispersion sol that contains silica-based fine particles having a negative charge on the surface and has a pH in an acidic region from 3.0 to 6.0. The surface of the silica-based fine particles has been modified with aluminum, and the amount of the modification by aluminum is preferably in the range of $0.05 \times 10^{-6}$ to $2.0 \times 10^{-6}$ mol/m² in terms of $Al_2O_3$ per unit surface area of the silica-based fine particles.

If the surface of the silica-based fine particles has a positive charge, the silica-based fine particles and the binder component will aggregate together in the coating composition and in the curable coating film, thereby lowering the transparency.

At a pH of less than 3.0, the silica-based fine particle dispersion sol shows low stability resulting in a decrease in film strength, transparency and scratch resistance of the resulted curable coating film. A pH in excess of 6.0 facilitates the progress of the hydrolysis of the binder component, or lowers the dispersibility of the silica-based fine particles to deteriorate the stability of the coating composition.

The amount of the modification by aluminum is preferably in the range of $0.05 \times 10^{-6}$ to $2.0 \times 10^{-6}$ mol/m², and more preferably $0.15 \times 10^{-6}$ to $1.8 \times 10^{-6}$ mol/m².

Any amount of the modification by aluminum that is less than $0.05 \times 10^{-6}$ mol/m² is not preferable because it causes a decrease in stability of the silica-based fine particle dispersion sol and an easy occurrence of aggregations in the curable coating film, resulting in deteriorations in film strength, transparency and scratch resistance of the curable coating film. An amount of the modification exceeding $2.0 \times 10^{-6}$ mol/m² is not preferable because a part of the aluminum that has modified the surface of the silica-based fine particles will be detached and acts as a catalyst to facilitate the hydrolysis of the binder component, resulting in a decrease in film strength.

When the silica-based fine particles are spherical particles, the average particle diameter measured by a BET method is preferably in the range of 5 to 50 nm. When the silica-based fine particles are chain particles, the average particle diameter calculated by the equation (longitudinal length+lateral length)/2 with respect to a transmission electron micrograph is preferably in the range of 5 to 50 nm. In the case of other particle shapes, the average particle diameter measured with respect to a transmission electron micrograph is preferably in the range of 5 to 50 nm.

If the average particle diameter is less than 5 nm, the silica-based fine particles are less stable in the coating composition, resulting in a decrease in film strength. An average particle diameter in excess of 50 nm is not favorable because the transparency of the coating film is lowered.

When the pH of the dispersion sol is 5.0, the amount of the negative charge on the surface of the silica-based fine particles is preferably in the range of 0.5 to 1.1 μeq/m², and more preferably 0.6 to 1.1 μeq/m² per specific surface area of the silica-based fine particles.

The amount of the negative charge is further preferably in the range of 0.6 to 1.0 μeq/m² for the spherical silica-based fine particles, and 0.6 to 1.1 μeq/m² for the chain silica-based fine particles.

When the amount of the negative charge is in this further preferred range, the stability and the transparency of the coating film are further improved. Because the chain silica-based fine particles are highly stable, a decrease in transparency is unlikely even when the amount of the negative charge per unit surface area is relatively large.

An amount of the negative charge that is less than 0.5 μeq/m² is not preferable because it can result in deteriorations in properties such as strength, transparency and scratch resistance of the resulted curable coating film. An amount of the negative charge in excess of 1.1 μeq/m² is not favorable in some applications because the transparency of the curable coating film can be lowered.

Preferably, at least a part of aluminum that has modified the surface of the silica-based fine particles is in the form of a silica/alumina composite oxide represented by Formula (I) below:

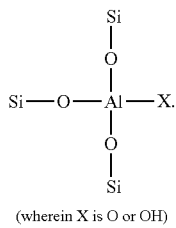

(I)

(wherein X is O or OH)

As a result of this configuration in which the aluminum has the structure of Formula (I) above, a strong negative charge can be given on the surface of the silica-based fine particles. In the case where the aluminum has formed a hydroxide or an oxide of aluminum alone, the surface will have a positive charge with the result that the silica-based fine particles aggregate with one another or with the binder component, thereby possibly lowering the strength and the scratch resistance of the curable coating film.

The solid concentration in the silica-based fine particle dispersion sol is preferably in the range of 5 to 60% by weight, and more preferably 20 to 50% by weight. If the solid concentration is less than 5% by weight, sufficient effects are often not obtained by the addition of the silica-based fine particles in the curable coating film. Any solid concentration in excess of 60% by weight is not preferable because the stability of the silica-based fine particles in the coating composition and in the curable coating film is lowered, possibly resulting in a decrease in strength or transparency of the coating film.

When the total content of the silica-based fine particles as solids contained in the dispersion sol and the silicon compound as a solute in the dispersion sol is 30% by weight in terms of oxide ($SiO_2$), the haze of the dispersion sol is preferably in the range of 0.5 to 20%.

Achieving a haze of less than 0.5% requires at least that ultrafine particles having an average particle diameter of less than 5 nm be used. However, the use of such ultrafine particles increases the viscosity of the resulted silica-based fine particle dispersion sol and is thus not favorable. A haze in excess of 20% is sometimes unfavorable because it results in a decrease in transparency of the curable coating film.

The dispersion medium of the silica-based fine particle dispersion sol may be water and/or at least one organic compound selected from alcohols such as methanol, ethanol, butanol, propanol and isopropyl alcohol, ethers such as ethylene glycol monomethyl ether, propylene glycol monomethyl ether and propylene glycol monoethyl ether, and ketones such as methyl ethyl ketone and γ-butyrolactone.

(B) Binder Components

The binder component may be appropriately selected from known binders as well as those currently under development in accordance with the purpose of use of the coating composition.

An example of the binder components is an organosilicon compound represented by Formula (II) below and/or a hydrolysate thereof:

(II)

(wherein $R^1$ is a $C_{1-6}$ alkyl group, a $C_8$ or lower organic group having a vinyl group, a $C_8$ or lower organic group having an epoxy group, a $C_8$ or lower organic group having a methacryloxy group, a $C_{1-5}$ organic group having a mercapto group, or a $C_{1-5}$ organic group having an amino group; $R^2$ is a $C_{1-3}$ alkyl, alkylene, cycloalkyl, halogenated alkyl or allyl group; $R^3$ is a $C_{1-3}$ alkyl, alkylene or cycloalkyl group; a is an integer of 0 or 1; and b is an integer of 0, 1 or 2).

Typical examples of the organosilicon compounds represented by Formula (II) include alkoxysilane compounds such as tetraethoxysilane, methyltrimethoxysilane, vinyltrimethoxysilane, γ-methacryloxypropyltrimethoxysilane, trimethylchlorosilane, α-glycidoxymethyltrimethoxysilane, α-glycidoxyethyltrimethoxysilane, β-glycidoxyethyltrimethoxysilane, γ-glycidoxypropyltrimethoxysilane, γ-glycidoxypropyltriethoxysilane, γ-glycidoxypropylmethyldimethoxysilane, γ-γ-glycidoxypropylmethyldiethoxysilane, β-(3,4-epoxycyclohexyl)-ethyltrimethoxysilane, β-(3,4-epoxycyclohexyl)-ethyltriethoxysilane, γ-aminopropyltrimethoxysilane, γ-aminopropyltriethoxysilane, N-β(aminoethyl)-γ-aminopropylmethyldimethoxysilane and N-β(aminoethyl)-γ-aminopropylmethyldiethoxysilane. The organosilicon compounds may be used singly, or two or more kinds may be used in combination.

In particular, the organosilicon compound and/or the hydrolysate thereof is preferable as the binder when the coating composition is used to form a hardcoat film on, for example, an optical substrate.

In the preparation of the coating composition of the present invention using the organosilicon compound as the binder component, it is preferable that the organosilicon compound be partially or completely hydrolyzed in the presence of an acid or water without a solvent or in a polar organic solvent such as an alcohol, and thereafter the partial hydrolysate or the hydrolysate be mixed with the silica-based fine particle dispersion sol. In an embodiment, the organosilicon compound and the silica-based fine particle dispersion sol may be mixed together first and the mixture may be partially or completely hydrolyzed.

The silica-based fine particle dispersion sol and the organosilicon compound and/or the hydrolysate thereof are preferably mixed in a weight ratio (X/Y) of 30/70 to 90/10, and more preferably 35/65 to 80/20 wherein X indicates the weight of the organosilicon compound in terms of $SiO_2$ and Y indicates the weight of the silica-based fine particles contained in the silica-based fine particle dispersion sol. If the weight ratio is less than 30/70, the adhesion with respect to a substrate or another coating film may be lowered. A weight ratio exceeding 90/10 may result in a decrease in scratch resistance of the resulted coating film.

Examples of the binder components further include thermosetting organic resins and thermoplastic organic resins. The thermosetting organic resin is preferably at least one selected from urethane resins, epoxy resins and melamine resins.

Specific examples of the urethane resins include reaction products between a block polyisocyanate such as hexamethylenediisocyanate and an active hydrogen-containing compound such as polyester polyol or polyether polyol. Specific examples of the epoxy resins include polyalkylene ether-modified epoxy resins and epoxy group-containing compounds in which a soft skeleton (soft segment) has been introduced into the molecular chain.

Specific examples of the melamine resins include cured products formed between etherified methylol melamine and polyester polyol or polyether polyol. Of the resins, the urethane resins that are cured products formed between a block isocyanate and a polyol are preferably used. The thermosetting organic resins may be used singly, or two or more kinds may be used in combination.

The thermoplastic organic resin as the binder component in the invention is preferably at least one selected from acrylic resins, urethane resins and ester resins, and is more preferably a self-emulsified aqueous emulsion resin.

Specific examples of the acrylic resins include aqueous emulsions obtained from an alkyl (meth)acrylate monomer, and polymer emulsions of copolymers of the above monomer and a comonomer such as styrene or acrylonitrile. Specific examples of the urethane resins include aqueous emulsions obtained by a reaction between a polyol compound such as polyester polyol, polyether polyol or polycarbonate polyol, and a polyisocyanate. Specific examples of the ester resins include water-dispersed elastomers that are multiblock copolymers in which the hard segment is a polyester and the soft segment is a polyether or a polyester. Of the resins, the water-dispersed urethane resins that are obtained from a polyester polyol or a polyether polyol, and a polyisocyanate are preferably used. The thermoplastic organic resins may be used singly, or two or more kinds may be used in combination.

When the thermosetting organic resin and the thermoplastic resin are used as the binder components, the coating composition may be prepared by mixing the resin(s) with the silica-based fine particle dispersion sol. They are preferably mixed in a weight ratio (R/S) of 90/10 to 30/70, and more preferably 80/20 to 35/65 wherein R indicates the weight of the resin(s) and S indicates the weight of the silica-based fine particles contained in the silica-based fine particle dispersion sol.

If the weight ratio is less than 30/70, the adhesion with respect to a substrate or another coating film, as well as the impact resistance of the coated substrate, may be lowered. A weight ratio exceeding 90/10 may result in a decrease in refractive index or heat resistance of the resulted coating film.

The coating composition is preferably an optical substrate coating composition, and is more preferably a coating composition for forming a hardcoat layer.

The coating composition according to the invention may further contain one or more additional components such as uncrosslinked epoxy compounds, surfactants, leveling agents, and/or UV absorbers, light stabilizers and diluent solvents.

The binder components used in the coating composition may include a metal alkoxide such as titanium alkoxide or a compound such as a UV curable compound (for example, a polyfunctional acrylic compound having an acryloyloxy group). Alternatively, compounds such as the UV curable compounds may be used instead of the thermosetting organic resins and the thermoplastic resins.

Curable Coating Films

Next, the curable coating films according to the present invention will be described.

The curable coating film of the invention is obtained by applying any of the above-described coating compositions onto a substrate. The curable coating film has high transparency, film strength and scratch resistance.

The curable coating film may be formed by applying (coating) the coating composition according to a known method such as dipping or spin coating.

The coating film of the coating composition that has been spread on the substrate may be thermally cured to give a cured coating film of the invention. The thermal curing may be performed by heating at 80 to 130° C. for 0.5 to 5 hours. The thickness of the cured coating film is desirably 1.0 to 5.0 μm, and preferably 1.5 to 4.0 μm.

Substrates Having Curable Coating Film

The substrate having a curable coating film according to the present invention is obtained by providing the inventive curable coating film on a substrate.

The inventive substrates having the coating film are not particularly limited. Because the curable coating film of the invention is excellent in transparency, film strength and scratch resistance, it may be suitably provided on substrates such as plastic or glass lenses, plastic films, plastic sheets, plastic panels and metals.

The plastics are not particularly limited. Examples thereof include resin compounds such as polystyrene resins, allyl resins, polycarbonate resins, polythiourethane resins, polythioepoxy resins, PMMA resins, ABS resins, epoxy resins, polysulfone resins, PET, TAC and acrylic resins.

The substrates having the coating film according to the invention may be used in various optical materials or display devices, in detail in various fields where resin composition substrates, glass substrates or metal substrates have been used.

[Measurement Methods and Evaluation Test Methods]

The measurement methods and the evaluation test methods that were used in Inventive Examples and other Examples will be described in detail below.

(1) Method for Measuring Specific Surface Area

The specific surface area of silica fine particles and that of silica-based fine particles were determined by a nitrogen adsorption method (a BET method). An amount of $HNO_3$ was added to 50 ml of a silica sol or a silica-based fine particle dispersion sol (the dispersion medium may be water or an organic solvent) so as to adjust the pH to 3.5. Further, 40 ml of 1-propanol was added. The mixture was dried at 110° C. for 16 hours. The resultant sample was crushed in a mortar and was calcined in a muffle furnace at 500° C. for 1 hour to obtain a measurement specimen. The measurement specimen was analyzed by a nitrogen adsorption method (a BET method) using a specific surface area measuring apparatus (MULTISORB 12 manufactured by YUASA IONICS CO., LTD.) to determine the amount of adsorbed nitrogen. From the obtained adsorption amount, the specific surface area was calculated by a single point BET method. In detail, 0.5 g of the specimen was placed into a cell and was subjected to degasification in a stream of a 30 vol % nitrogen/70 vol % helium mixture gas at 300° C. for 20 minutes, and thereafter the specimen was held at the liquid nitrogen temperature in the mixture gas flow whereby the adsorption of nitrogen to the specimen attained equilibrium. Subsequently, while flowing the mixture gas, the temperature of the specimen was gradually increased to room temperature. The amount of nitrogen that was released during the temperature increase was measured. The specific surface area ($m^2/g$) of the silica fine particles or the silica-based fine particles was calculated on the basis of a calibration curve that had been prepared beforehand.

(2) Methods for Measuring Average Particle Diameter

A BET method was adopted to measure the average particle diameter of spherical silica fine particles or spherical silica-based fine particles. The average particle diameter of chain silica fine particles or chain silica-based fine particles was determined with respect to a transmission electron micrograph.

Average Particle Diameter of Spherical Particles

The specific surface area ($m^2/g$) of the silica fine particles or the silica-based fine particles obtained by the aforementioned method was applied to the following equation to determine the average particle diameter (nm).

Average particle diameter (nm)=6000/[specific surface area ($m^2/g$)×density ($\rho$)]

Here, the density of silica, 2.2, was used as the density ($\rho$).

Regarding spherical particles, the average particle diameter according to a BET method is substantially equal to the average particle diameter obtained with respect to a transmission electron micrograph.

Average Particle Diameter of Chain Particles

A TEM picture was taken at ×500000 magnification at an accelerating voltage of 150 kV using a transmission electron microscope (H-800 manufactured by HITACHI). At least 100 chain particles in the micrograph were arbitrarily selected, and the shorter diameter and the longer diameter of the secondary particles were visually measured. The average particle diameter was determined according to the equation (shorter diameter+longer diameter)/2. Here, the average particle diameter of the chain particles indicates the average particle diameter of the chain secondary particles.

(3) Method for Measuring pH 50 ml of a sample was added into a cell. The cell was placed in a thermostatic bath at 25° C., and a glass electrode of a pH meter (F22 manufactured by HORIBA, Ltd.) that had been calibrated using standard liquids of pH values of 4, 7 and 9 was inserted into the sample to measure the pH.

The sample was a silica-based fine particle water dispersion sol having a solid concentration of 30% by weight, or a silica-based fine particle organic solvent dispersion sol having a solid concentration of 3.0% by weight that had been obtained by diluting a silica-based fine particle organic solvent dispersion sol with a 30% by weight solid concentration with distilled water ten times. The pH of a commercial alkaline silica sol was measured by the above method.

(4) Methods for Measuring Contents of Silicon, Aluminum and Sodium in Silica Sol or Silica-Based Fine Particle Dispersion Sol (a) Content of Silicon 2 ml of a 50% aqueous sulfuric acid solution was added to 10 g of a silica sol or a silica-based fine particle dispersion sol (the dispersion medium may be water or an organic solvent). The mixture was evaporated to dryness on a platinum dish. The resultant solid was calcined at 1000° C. for 1 hour, cooled and weighed. The weighed solid was dissolved in a trace amount of a 50% aqueous sulfuric acid solution, and 20 ml of hydrofluoric acid was added. The mixture was evaporated to dryness on a platinum dish. The resultant solid was calcined at 1000° C. for 15 minutes, cooled and weighed. The difference in weight was obtained as the content (wt % in terms of $SiO_2$) of silicon contained in the silica sol, or the silica-based fine particle water dispersion sol or the silica-based fine particle organic solvent dispersion sol.

(b) Content of Aluminum 1) 1 g of a silica sol or a silica-based fine particle dispersion sol (the dispersion medium may be water or an organic solvent) was collected on a platinum dish. The weight was measured with an accuracy of 0.1 mg.

2) 20 ml of hydrofluoric acid was added, and the mixture was evaporated to dryness by heating on a sand bath.

3) The sample obtained in 2) was cooled to room temperature, and 5 ml of hydrochloric acid and approximately 50 ml of water were added. The mixture was heated on a sand bath to give a solution.

4) The sample obtained in 3) was cooled to room temperature and was placed into a 200 ml volume flask. The sample was diluted with water to a volume of 200 ml, thereby preparing a sample solution.

5) The sample solution obtained in 4) was analyzed with an inductively-coupled plasma emission spectroscopic analyzer (ICPS-8100 manufactured by SHIMADZU CORPORATION, detection wavelength 396.153 nm) to determine the amount of aluminum in % by weight in terms of $Al_2O_3$.

(c) Content of Sodium 1) 1 g of a silica sol or a silica-based fine particle dispersion sol (the dispersion medium may be water or an organic solvent) was collected on a platinum dish. The weight was measured with an accuracy of 0.1 mg.

2) 20 ml of hydrofluoric acid was added, and the mixture was evaporated to dryness by heating on a sand bath.

3) The sample obtained in 2) was cooled to room temperature, and 5 ml of hydrochloric acid and approximately 50 ml of water were added. The mixture was heated on a sand bath to give a solution.

4) The sample obtained in 3) was cooled to room temperature and was placed into a 200 ml volume flask; The sample was diluted with water to a volume of 200 ml, thereby preparing a sample solution.

5) The sample solution obtained in 4) was analyzed with an atomic absorption spectrometer (Z-5300 manufactured by Hitachi, Ltd., measurement mode: atomic absorption, measurement wavelength range: 190 to 900 nm) to determine the amount of sodium in terms of $Na_2O_3$. Atomic absorption spectroscopy is an analytical method in which a sample solution is vaporized by a flame atomizer, light of an appropriate wavelength is applied to the atomized gas phase, and the concentration of the element in the sample solution is obtained on the basis of the intensity of absorbed light. 589.0 nm was adopted as the wavelength for detecting sodium.

(5) Method for Measuring Amount of Negative Charge on Surface 1.67 g of a silica-based fine particle dispersion sol (the dispersion medium may be water or an organic solvent) having a solid concentration of 30% by weight was collected, and 98.53 g of distilled water was added thereto, resulting in 100.00 g of a mixture solution having a solid concentration of 0.5% by weight. An aqueous hydrochloric acid solution or an aqueous ammonia solution was added to the mixture liquid to give a sample aqueous solution that had a pH of 5.0 at 25° C. A 20.00 g portion of the sample solution was subjected to cation titration with streaming potential measurement with a streaming potential meter (PCD-T3 manufactured by MUETEK) using Poly-Dadmac as a standard cation titration liquid. The titration value determined with streaming potential measurement was obtained as the amount of the surface negative charge.

The value obtained by the above measurement indicates an amount (μeq/g) of surface negative charge per 1 g of the silica fine particles or the silica-based fine particles. The value was divided by the specific surface area (m$^2$/g) of the silica-based fine particles to give an amount of negative charge per unit specific surface area of the silica-based fine particles.

(6) Method for Measuring Haze of Silica-Based Fine Particle Dispersion Sol

A silica-based fine particle dispersion sol (the dispersion medium may be water or an organic solvent) having a solid concentration of 30% by weight was placed into a quartz cell having a light path length of 33 mm. The turbidity (haze) was measured using a color difference/turbidity meter (COH-300A manufactured by NIPPON DENSHOKU INDUSTRIES CO., LTD.).

(7) Method for Calculating Modification Amount of Aluminum of Silica-Based Fine Particles The amount of modification by aluminum (the number of moles in terms of Al$_2$O$_3$) per 1 g of the silica-based fine particles was obtained by the following equation wherein $C_{SiO2}$ is the content of silicon (% by weight in terms of SiO$_2$) in the silica-based fine particle dispersion sol, $C_{Al2O3}$ is the content of aluminum (% by weight in terms of Al$_2$O$_3$), and $C_{M2O}$ is the content of the alkali metal (% by weight in terms of M$_2$O) that have been measured by the method (3). The molecular weight of Al$_2$O$_3$ was 102.

$$\text{Amount of modification by aluminum per 1 g of silica-based fine particles (mol/g)} = [C_{Al2O3}/(C_{SiO2}+C_{Al2O3}+C_{M2O})]/102$$

The obtained value was divided by the specific surface area (M$^2$/g) of the silica-based fine particles to give an amount of modification by aluminum per unit surface area of the silica-based fine particles.

(8) Method for Measuring Viscosity

A silica-based fine particle dispersion sol (the dispersion medium may be water or an organic solvent) having a solid concentration of 30% by weight was collected in a volume of 20 ml. The viscosity thereof was measured with a viscometer (TV-10M manufactured by TOKI SANGYO CO., LTD.) at room temperature. The rotational speed of the viscometer was 60 rpm when the viscosity of the sample was in the range of 1.0 to 10.0 mPa·s, 30 rpm in the range of 10.0 to 20.0 mPa·s, 12 rpm in the range of 20.0 to 50.0 mPa·s, and 6 rpm in the range of 50.0 to 100.0 mPa·s.

(9) Method for Testing Film Hardness (Bayer Value)

A test lens prepared in Preparation Example in Example and a standard lens are tested with abrasion tester B™ (manufactured by COLTS Laboratories, Inc. in the U.S.) and the haze thereof is measured with a haze meter (NDH2000 manufactured by NIPPON DENSGOKU INDUSTRIES CO., LTD.). The changes in the haze value are studied to determine the Bayer value. The standard lens is substrate CR39 (diethylene glycol bis-allyl carbonate). First, the haze value of each lens is measured. The initial haze value of the standard lens is defined as D (std0), and that of the test lens is defined as D (test0). Each of the lenses is placed on a pan of the abrasion tester, and an abrasive (sand) weighing 500 g is spread on the lens. The lens is then moved left and right 600 times. The haze value of the standard lens after the test is defined as D (stdf), and that of the test lens after the test is defined as D (testf). The Bayer value (R) is calculated by the following equation:

$$R=[D(stdf)-D(std0)]/[D(testf)-D(test0)]$$

(10) Scratch Resistance Test

The surface of a test piece prepared in Preparation Example in Example was rubbed with BONSTAR STEEL WOOL No. 0000 (manufactured by Nippon Steel Wool Co., Ltd.) with a load of 1 kg, over a distance of 3 cm at 50 reciprocations/100 seconds. The level of scratches was visually evaluated on the basis of the following criteria:
  A: Substantially no scratches
  B: Slight scratches
  C: Marked scratches
  D: Scratches on almost the entire rubbed area

(11) Appearance of Coating Film (Cloudiness)

A fluorescent lamp "Mellow 5N (trade name)" (three-wavelength neutral white fluorescent lamp manufactured by TOSHIBA LIGHTING & TECHNOLOGY CORPORATION) is attached in a box having black inside walls. A sample plate that has a hardcoat layer containing the metal oxide fine particles is placed immediately below the fluorescent lamp so as to be perpendicular thereto. The transparency (the degree of cloudiness) is visually evaluated based on the following criteria:
  A: Not cloudy
  B: Slightly cloudy
  C: Cloudy
  D: Markedly cloudy

(12) Adhesion Test

The surface of a test piece prepared in Preparation Example in Example was cut with a knife at intervals of 1 mm so as to form a grid pattern composed of 100 squares, each 1 mm$^2$. A cellophane adhesive tape was strongly pressed against the squares and was sharply pulled at 90° with respect to the in-plane direction of the plastic lens base plate. These procedures were performed five times, and the number of the squares that remained attached was counted. The adhesion was evaluated based on the following criteria:
  Good: 95 or more squares remained attached.
  Bad: Less than 95 squares remained attached.

(13) Hot Water Resistance Test

A test piece prepared in Preparation Example in Example was soaked in water at 90° C. for 120 minutes and was subjected to the adhesion test in the manner described above. The hot water resistance was evaluated based on the following criteria:
  Good: 95 or more squares remained attached.
  Bad: Less than 95 squares remained attached.

(14) Impact Resistance Test

A hard ball weighing 17 g was dropped from a height of 127 cm onto the central area of a test piece prepared in Preparation Example in Example. The impact resistance was evaluated based on the following criteria:

Absent: No cracks were found in the test piece (including when the test piece was cracked but the broken pieces did not scatter).

Present: The test piece was cracked, and some or all of the broken pieces scattered.

EXAMPLES

The present invention will be described in detail by presenting examples hereinbelow without limiting the scope of the invention.

Example 1

Preparation (1) of Silica-Based Fine Particle Water Dispersion Sol

Step (1)

A 13 L volume SUS reactor equipped with a stirrer and a heating device was charged with 4000 g of a commercial alkaline silica sol in which spherical colloidal silica fine particles were dispersed (product name: CATALOID SI-40 manufactured by JGC Catalysts and Chemicals Ltd., $SiO_2$ concentration of 40% by weight, $Na_2O$ concentration: 0.40% by weight, pH: 9.5, average particle diameter: 17 nm, $Al_2O_3/SiO_2$ (molar ratio)=0.0006). While stirring was performed at a temperature of 25° C., 2712 g of an aqueous sodium aluminate solution having a concentration of 0.9% by weight in terms of $Al_2O_3$ was added at a constant rate in 1.0 hour, resulting in a mixture solution. At this time, the $Al_2O_3/SiO_2$ (mixing molar ratio) was 0.009, and the rate of addition of the aqueous sodium aluminate solution was $1.5 \times 10^{-2}$ g/hr.

Step (1.1)

The mixture solution was heated to 95° C. with stirring. While the temperature was maintained at 95° C., the mixture solution was stirred for 6.0 hours. The pH of the mixture liquid was 10.9, the solid concentration in terms of $SiO_2$ was 24.2% by weight, and the solid concentration in terms of $Al_2O_3$ was 0.36% by weight.

Step (1.2)

A cation exchange resin (DIAION SK1BH manufactured by Mitsubishi Chemical Corporation) was added to the mixture solution obtained in the above step, and thereby the pH was adjusted to 9.

Step (2)

After the resin was separated and removed from the mixture solution obtained in the above step, the solution was heat treated in an autoclave at 165° C. for 1 hour to give an alkaline silica-based fine particle water dispersion sol.

Step (3)

The alkaline silica-based fine particle water dispersion sol obtained in the above step was cooled to a room temperature and was mixed with a cation exchange resin (DIAION SK1BH manufactured by Mitsubishi Chemical Corporation) so as to adjust the pH to 3.5. Without removing the resin, the sol was aged for 7 hours while performing stirring at a constant temperature of 80° C. Thereafter, the cation exchange resin was separated and removed, thereby obtaining a silica-based fine particle water dispersion sol having a solid concentration in terms of $SiO_2$ of 24.2% by weight, a viscosity of 1.99 mPa·s, and a pH of 4.9.

The silica-based fine particle water dispersion sol was concentrated with an ultrafiltration membrane to give 5400 g of a silica-based fine particle water dispersion sol (SW1) having a solid concentration of 30% by weight. The silica-based fine particle water dispersion sol had a $SiO_2$ concentration of 29.34% by weight, a $Al_2O_3$ concentration of 0.42% by weight, a $Na_2O$ concentration of 0.24% by weight, a $Al_2O_3/SiO_2$ molar ratio of $84 \times 10^{-4}$, a pH of 4.8, a haze of 2.5%, a viscosity of 3.5 mPa·s, and a viscosity after an accelerated test at 40° C. for 7 days of 3.5 mPa·s. The silica-based fine particles contained in the silica-based fine particle water dispersion sol were spherical. The average particle diameter and the specific surface area according to the BET method were 16.8 nm and 162 $m^2$/g. The amount of the negative charge per unit specific surface area of the silica-based fine particles was 0.9 µeq/$m^2$. The amount of modification by aluminum was $0.85 \times 10^{-6}$ mol/$m^2$ per unit surface area of the silica-based fine particles.

When the silica-based fine particle water dispersion sol was concentrated with a rotary evaporator to a solid concentration of 50% by weight, the viscosity of the concentrate was 45 mPa·s.

Preparation (1) of Silica-Based Fine Particle Methanol Dispersion Sol 5400 g of the silica-based fine particle water dispersion sol obtained in the above step was treated with an ultrafiltration membrane filter (ultrafiltration membrane SIP-1013 manufactured by Asahi Kasei Corporation) to substitute the dispersion medium, water, with methanol (manufactured by HAYASHI PURE CHEMICAL IND., LTD., methyl alcohol concentration: 99.9% by weight).

The obtained silica-based fine particle methanol dispersion sol (SM1) had a water content of approximately 0.5% by weight, a solid concentration of 30% by weight, a solid concentration in terms of $SiO_2$ of 29.34% by weight, a pH after diluted ten times with distilled water of 5.2, a haze of 2.7%, a viscosity of 1.5 mPa·s, and a viscosity after an accelerated test for 7 days of 1.5 mPa·s. The average particle diameter and the specific surface area of the silica-based fine particles contained in the silica-based fine particle methanol dispersion sol were 16.8 nm and 162 $m^2$/g. The amount of modification by aluminum in terms of $Al_2O_3$ was $0.85 \times 10^{-6}$ mol/$m^2$ per unit surface area of the silica-based fine particles. The amount of the negative charge per unit specific surface area of the silica-based fine particles was 0.9 µeq/$m^2$.

Preparation of Coating Composition (H1) for Forming Hardcoat Layer

A plurality of containers were provided which contained 180 g of γ-glycidoxypropyltrimethoxysilane (Z-6040 manufactured by Dow Corning Toray Co., Ltd.) and 90 g of methanol (manufactured by HAYASHI PURE CHEMICAL IND., LTD., methyl alcohol concentration: 99.9% by weight). While performing stirring, 86 g of a 0.01 N aqueous hydrochloric acid solution was added dropwise to each of the containers containing the mixture liquid. Further, the mixture liquid was stirred at room temperature for one day to hydrolyze the silane compound.

Subsequently, to each of the containers containing the hydrolysate liquid were added 333 g of the silica-based fine particle water dispersion sol (SW1) of 30% by weight solid concentration that had been prepared in Example 1, 303 g of propylene glycol monomethyl ether (manufactured by The Dow Chemical Company), 1.5 g of tris(2,4-pentanedionato) aluminum III (manufactured by TOKYO CHEMICAL INDUSTRY CO., LTD.), and 0.6 g of a silicone surfactant (L-7604 manufactured by Dow Corning Toray Co., Ltd.) as a leveling agent. The resultant mixture in each container was stirred at room temperature for one day to give a hardcoat coating composition (H1) as an optical substrate coating composition.

Example 2

Preparation (2) of Silica-Based Fine Particle Water Dispersion Sol

A silica-based fine particle water dispersion sol (SW2) was prepared in the same manner as in Example 1, except that the amount of the aqueous sodium aluminate solution (concentration: 0.9% by weight) was changed from 2712 g in the step (1) in Example 1 to 1532 g, and that the aqueous sodium aluminate solution was added to 4000 g of the alkaline silica sol (CATALOID SI-40 manufactured by JGC Catalysts and Chemicals Ltd.) over a period of 34 minutes instead of 1 hour.

In the addition of the aqueous sodium aluminate solution to the alkaline silica sol in the step (1), the $Al_2O_3/SiO_2$ molar ratio was 0.005, and the rate of addition of the sodium aluminate was $1.5 \times 10^{-2}$ g/hr.

The silica-based fine particle water dispersion sol (SW2) had a solid concentration in terms of $SiO_2$ of 30.1% by weight, a solid concentration in terms of $Al_2O_3$ of 0.14% by weight, a solid concentration in terms of $Na_2O$ of 0.10% by weight, a $Al_2O_3/SiO_2$ molar ratio of $27 \times 10^{-4}$, a pH of 3.9, a haze of 2.7%, a viscosity of 3.2 mPa·s, and a viscosity after an accelerated test at 40° C. for 7 days of 3.3 mPa·s. The silica-based fine particles contained in the silica-based fine particle water dispersion sol were spherical. The average particle diameter and the specific surface area according to the BET method were 16.6 nm and 164 m²/g. The amount of modification by aluminum was $0.28 \times 10^{-6}$ mol/m² per unit specific surface area of the particles. The amount of the negative charge per unit specific surface area of the particles was 0.61 μeq/m².

When the silica-based fine particle water dispersion sol was concentrated with a rotary evaporator to a solid concentration of 50% by weight, the viscosity of the concentrate was 89 mPa·s.

Preparation (2) of Silica-Based Fine Particle Methanol Dispersion Sol

A silica-based fine particle methanol dispersion sol (SM2) was prepared in the same manner as described in Preparation (1) of silica-based fine particle methanol dispersion sol in Example 1, except that the silica-based fine particle water dispersion sol (SW1) was replaced by the silica-based fine particle water dispersion sol (SW2).

The obtained silica-based fine particle methanol dispersion sol (SM2) had a water content of approximately 0.5% by weight, a solid concentration in terms of $SiO_2$ of 30.1% by weight, a pH after diluted ten times with distilled water of 4.3, a haze of 2.1%, a viscosity of 1.7 mPa·s, and a viscosity after an accelerated test for 7 days of 1.7 mPa·s. The average particle diameter and the specific surface area of the silica-based fine particles contained in the silica-based fine particle methanol dispersion sol were 16.6 nm and 164 m²/g. The amount of modification by aluminum was $0.28 \times 10^{-6}$ mol/m² per unit surface area of the silica-based fine particles. The amount of the negative charge per unit specific surface area of the silica-based fine particles was 0.61 μeq/m².

Preparation of Coating Composition (H2) for Forming Hardcoat Layer

A hardcoat coating composition (H2) was prepared in the same manner as described in Preparation of coating composition (H1) for forming hardcoat layer in Example 1, except that the silica-based fine particle water dispersion sol (SW1) was replaced by the silica-based fine particle water dispersion sol (SW2).

Example 3

Preparation (3) of Silica-Based Fine Particle Water Dispersion Sol

A silica-based fine particle water dispersion sol (SW3) having a solid concentration of 30% by weight was prepared in the same manner as in Example 1, except that the amount of the aqueous sodium aluminate solution (concentration: 0.9% by weight) was changed from 2712 g in the step (1) in Example 1 to 12286 g, and that the aqueous sodium aluminate solution was added to 4000 g of the alkaline silica sol (CATALOID SI-40 manufactured by JGC Catalysts and Chemicals Ltd.) over a period of 4.5 hours instead of 1 hour.

In the addition of the aqueous sodium aluminate solution to the alkaline silica sol in the step (1), the $Al_2O_3/SiO_2$ molar ratio was 0.04, and the rate of addition of the sodium aluminate was $1.5 \times 10^{-2}$ g/hr.

The silica-based fine particle water dispersion sol (SW3) had a $SiO_2$ concentration of 28.84% by weight, a $Al_2O_3$ concentration of 0.78% by weight, a $Na_2O$ concentration of 0.38% by weight, a $Al_2O_3/SiO_2$ molar ratio of $160 \times 10^{-4}$, a pH of 5.1, a haze of 4.1%, a viscosity of 8.7 mPa·s, and a viscosity after an accelerated test at 40° C. for 7 days of 8.9 mPa·s.

The silica-based fine particles contained in the silica-based fine particle water dispersion sol were spherical. The average particle diameter and the specific surface area according to the BET method were 17.4 nm and 157 m²/g. The amount of the negative charge per unit specific surface area of the particles was 0.96 μeq/m². The amount of modification by aluminum was $0.16 \times 10^{-6}$ mol/m² per unit specific surface area of the particles.

When the silica-based fine particle water dispersion sol was concentrated with a rotary evaporator to a solid concentration of 50% by weight, the viscosity of the concentrate was 123 mPa·s.

Preparation (3) of Silica-Based Fine Particle Methanol Dispersion Sol

A silica-based fine particle methanol dispersion sol (SM3) was prepared in the same manner as described in Preparation (1) of silica-based fine particle methanol dispersion sol in Example 1, except that the silica-based fine particle water dispersion sol (SW1) was replaced by the silica-based fine particle water dispersion sol (SW3).

The obtained silica-based fine particle organic solvent dispersion sol (SM3) had a water content of approximately 0.5% by weight, a solid concentration in terms of $SiO_2$ of 28.84% by weight, a pH after diluted ten times with distilled water of 5.6, a haze of 3.8%, a viscosity of 2.9 mPa·s, and a viscosity after an accelerated test for 7 days of 2.9 mPa·s. The average particle diameter and the specific surface area of the silica-based fine particles contained in the silica-based fine particle methanol dispersion sol were 17.4 nm and 157 m²/g. The amount of modification by aluminum was $0.16 \times 10^{-6}$ mol/m² per unit specific surface area of the particles. The amount of the negative charge per unit specific surface area of the particles was 0.96 μeq/m².

Preparation of Coating Composition (H3) for Forming Hardcoat Layer

A hardcoat coating composition (H3) was prepared in the same manner as described in Preparation of coating composition (H1) for forming hardcoat layer in Example 1, except that the silica-based fine particle water dispersion sol (SW1) was replaced by the silica-based fine particle water dispersion sol (SW3).

Example 4

Preparation (4) of Silica-Based Fine Particle Water Dispersion Sol

A silica-based fine particle water dispersion sol (SW4) having a solid concentration of 30% by weight was prepared in the same manner as in Example 1, except that after the mixture liquid of the alkaline silica sol and the aqueous sodium aluminate solution was adjusted to pH 9 with the cation exchange resin, it was heat treated in an autoclave at 90° C. for 1 hour instead of the heat treatment at 165° C. for 1 hour in the step (2) of Example 1.

The silica-based fine particle water dispersion sol (SW4) had a $SiO_2$ concentration of 29.35% by weight, a $Al_2O_3$ concentration of 0.41% by weight, a $Na_2O$ concentration of 0.27% by weight, a $Al_2O_3/SiO_2$ molar ratio of $82 \times 10^{-4}$, a pH of 4.5, a haze of 4.3%, a viscosity of 8.6 mPa·s, and a viscosity after an accelerated test at 40° C. for 7 days of 8.6 mPa·s.

The silica-based fine particles contained in the silica-based fine particle water dispersion sol were spherical. The average particle diameter and the specific surface area according to the BET method were 17 nm and 160 $m^2/g$. The amount of the negative charge per unit surface area of the particles was 0.76 µeq/$m^2$. The amount of modification by aluminum was $0.84 \times 10^{-6}$ mol/$m^2$ per unit surface area of the particles.

When the silica-based fine particle water dispersion sol was concentrated with a rotary evaporator to a solid concentration of 50% by weight, the viscosity of the concentrate was 120 mPa·s.

Preparation (4) of Silica-Based Fine Particle Methanol Dispersion Sol

A silica-based fine particle methanol dispersion sol (SM4) was prepared in the same manner as described in Preparation (1) of silica-based fine particle methanol dispersion sol in Example 1, except that the silica-based fine particle water dispersion sol (SW1) was replaced by the silica-based fine particle water dispersion sol (SW4). The water content was approximately 0.5% by weight.

The obtained silica-based fine particle methanol dispersion sol (SM4) had a water content of approximately 0.5% by weight, a solid concentration in terms of $SiO_2$ of 29.35% by weight, a pH after diluted ten times with distilled water of 5.3, a haze of 3.7%, a viscosity of 3.7 mPa·s, and a viscosity after an accelerated test for 7 days of 3.7 mPa·s. The average particle diameter and the specific surface area of the silica-based fine particles contained in the silica-based fine particle methanol dispersion sol were 17 nm and 160 $m^2/g$. The amount of modification by aluminum in terms of $Al_2O_3$ was $0.84 \times 10^{-6}$ mol/$m^2$ per unit surface area of the silica-based fine particles. The amount of the negative charge on the surface of the silica-based fine particles was 0.76 µeq/$m^2$.

Preparation of Coating Composition (H4) for Forming Hardcoat Layer

A hardcoat coating composition (H4) was prepared in the same manner as described in Preparation of coating composition (H1) for forming hardcoat layer in Example 1, except that the silica-based fine particle water dispersion sol (SW1) was replaced by the silica-based fine particle water dispersion sol (SW4).

Example 5

Preparation (5) of Silica-Based Fine Particle Water Dispersion Sol

A silica-based fine particle water dispersion sol (SW5) was prepared in the same manner as described in Preparation (1) of silica-based fine particle water dispersion sol in Example 1, except that 4000 g of the commercial silica sol (product name: CATALOID SI-40 manufactured by JGC Catalysts and Chemicals Ltd., $SiO_2$ concentration: 40.7% by weight, $Na_2O$ concentration: 0.40% by weight, pH: 9.5, average particle diameter: 17 nm) used in the step (1) in Example 1 was replaced by 5338 g of a commercial silica sol in which spherical colloidal silica fine particles were dispersed (product name: CATALOID SI-350 manufactured by JGC Catalysts and Chemicals Ltd., $SiO_2$ concentration: 30.5% by weight, $Na_2O$ concentration: 0.57% by weight, pH: 9.8, average particle diameter: 7 nm).

In the step (1) of this example, the alkaline silica sol and the aqueous sodium aluminate solution were mixed in a $Al_2O_3/SiO_2$ molar ratio of 0.009, and the rate of addition of the aqueous sodium aluminate solution was $1.5 \times 10^{-2}$ g/hr.

The silica-based fine particle water dispersion sol (SW5) had a $SiO_2$ concentration of 29.36% by weight, a $Al_2O_3$ concentration of 0.43% by weight, a $Na_2O$ concentration of 0.29% by weight, a $Al_2O_3/SiO_2$ molar ratio of $86 \times 10^{-4}$, a pH of 4.9, a haze of 2.1%, a viscosity of 15.1 mPa·s, and a viscosity after an accelerated test at 40° C. for 7 days of 15.3 mPa·s. The silica-based fine particles contained in the silica-based fine particle water dispersion sol were spherical. The average particle diameter and the specific surface area according to the BET method were 7.1 nm and 385 $m^2/g$. The amount of the negative charge per unit specific surface area of the particles was 0.69 µeq/$m^2$. The amount of modification by aluminum was $0.37 \times 10^{-6}$ mol/$m^2$ per unit specific surface area of the particles.

When the silica-based fine particle water dispersion sol was concentrated with a rotary evaporator to a solid concentration of 50% by weight, the viscosity of the concentrate was 223 mPa·s.

Preparation (5) of Silica-Based Fine Particle Methanol Dispersion Sol

A silica-based fine particle methanol dispersion sol (SM5) was prepared in the same manner as described in Preparation (1) of silica-based fine particle methanol dispersion sol in Example 1, except that the silica-based fine particle water dispersion sol (SW1) was replaced by the silica-based fine particle water dispersion sol (SW5). The water content was approximately 0.5% by weight.

The obtained silica-based fine particle methanol dispersion sol had a solid concentration in terms of $SiO_2$ of 29.36% by weight, a pH after diluted ten times with distilled water of 5.4, a haze of 1.3%, a viscosity of 4.5 mPa·s, and a viscosity after an accelerated test for 7 days of 4.5 mPa·s. The average particle diameter and the specific surface area of the silica-based fine particles contained in the silica-based fine particle methanol dispersion sol were 7.1 nm and 385 $m^2/g$. The amount of modification by aluminum was $0.37 \times 10^{-6}$ mol/$m^2$ per unit specific surface area of the particles. The amount of the negative charge was 0.69 µeq/$m^2$ per unit specific surface area of the particles.

Preparation of Coating Composition (H5) for Forming Hardcoat Layer

A hardcoat coating composition (H5) was prepared in the same manner as described in Preparation (1) of coating composition (1) for forming hardcoat layer in Example 1, except that the silica-based fine particle water dispersion sol (SW1) was replaced by the silica-based fine particle water dispersion sol (SW5).

Example 6

Preparation (6) of Silica-Based Fine Particle Water Dispersion Sol

A silica-based fine particle water dispersion sol (SW6) was prepared in the same manner as in Example 1, except that 4000 g of the commercial silica sol (product name: CATALOID SI-40 manufactured by JGC Catalysts and Chemicals Ltd., $SiO_2$ concentration: 40.7% by weight, $Na_2O$ concentration: 0.40% by weight, pH: 9.5, average particle diameter: 217 nm) used in the step (1) in Example 1 was replaced by 3357 g of a commercial silica sol in which colloidal spherical silica fine particles were dispersed (product name: CATALOID SI-50 manufactured by JGC Catalysts and Chemicals Ltd., $SiO_2$ concentration: 48.5% by weight, $Na_2O$ concentration: 0.48% by weight, pH: 9.4, average particle diameter: 25 nm).

In the step (1) of this example, the alkaline silica sol and the aqueous sodium aluminate solution were mixed in a $Al_2O_3/SiO_2$ molar ratio of 0.009, and the rate of addition of the aqueous sodium aluminate solution was $1.5 \times 10^{-2}$ g/hr.

The silica-based fine particle water dispersion sol (SW6) had a $SiO_2$ concentration of 29.35% by weight, a $Al_2O_3$ concentration of 0.40% by weight, a $Na_2O$ concentration of 0.23% by weight, a $Al_2O_3/SiO_2$ molar ratio of $80 \times 10^{-4}$, a pH of 4.6, a haze of 11.5%, a viscosity of 3.0 mPa·s, and a viscosity after an accelerated test at 40° C. for 7 days of 3.1 mPa·s.

The silica-based fine particles contained in the silica-based fine particle water dispersion sol were spherical. The average particle diameter and the specific surface area according to the BET method were 25 nm and 109 m²/g. The amount of the negative charge per unit surface area of the particles was 0.87 µeq/m². The amount of modification by aluminum was $1.2 \times 10^{-6}$ mol/m² per unit surface area of the particles.

When the silica-based fine particle water dispersion sol was concentrated with a rotary evaporator to a solid concentration of 50% by weight, the viscosity of the concentrate was 61 mPa·s.

Preparation (6) of Silica-Based Fine Particle Methanol Dispersion Sol

A silica-based fine particle methanol dispersion sol (SM6) was prepared in the same manner as described in Preparation (1) of silica-based fine particle methanol dispersion sol in Example 1, except that the silica-based fine particle water dispersion sol (SW1) was replaced by the silica-based fine particle water dispersion sol (SW6). The water content was approximately 0.5% by weight.

The obtained silica-based fine particle methanol dispersion sol had a solid concentration in terms of $SiO_2$ of 29.35% by weight, a pH after diluted ten times with distilled water of 5.1, a haze of 9.8%, a viscosity of 1.2 mPa·s, and a viscosity after an accelerated test for 7 days of 1.2 mPa·s. The average particle diameter and the specific surface area of the silica-based fine particles contained in the silica-based fine particle methanol dispersion sol were 25 nm and 109 m²/g. The amount of modification by aluminum was $1.2 \times 10^{-6}$ mol/m² per unit surface area of the particles. The amount of the negative charge was 0.87 µeq/m² per unit surface area of the particles.

Preparation of Coating Composition (H6) for Forming Hardcoat Layer

A hardcoat coating composition (H6) was prepared in the same manner as described in Preparation of coating composition (H1) for forming hardcoat layer in Example 1, except that the silica-based fine particle water dispersion sol (SW1) was replaced by the silica-based fine particle water dispersion sol (SW6).

Example 7

Preparation of Alkaline Silica Sol in which Chain Silica Fine Particles were Dispersed Ion exchange water weighing 24000 g was added to 8000 g of an alkaline silica sol in which spherical silica fine particles were dispersed (product name: CATALOID SI-550 manufactured by JGC Catalysts and Chemicals Ltd., $SiO_2$ concentration: 20% by weight, $Na_2O$ concentration: 0.70% by weight, pH: 10.4, average particle diameter: 5 nm, $Al_2O_3/SiO_2$ (molar ratio)=0.0006). Further, 2472 g of a cation exchange resin (DIAION SK-1BH manufactured by Mitsubishi Chemical Corporation) was added. The mixture was stirred at 25° C. for 30 minutes to perform dealkalization.

After the cation exchange resin was separated, 21333 g of ion exchange water was added to give a silica sol having a $SiO_2$ concentration of 3% by weight. The pH of the silica sol was 3.9. The silica sol was then treated in an autoclave at 165° C. for 3 hours to give a hydrothermally treated chain silica sol having a $SiO_2$ concentration of 3% by weight. The chain silica fine particles contained in the chain silica sol were colloidal, namely, dispersed without precipitating in water. Arbitrary 100 secondary particles observed in a transmission electron micrograph had an average shorter diameter of 9 nm and an average longer diameter of 27 nm, which gave an average particle diameter of 18 nm. The chain particles contained an average of 3 primary particles that were coupled together. The pH of the chain silica sol was 7.0, and the specific surface area was 274 m²/g.

Subsequently, a 3% by weight aqueous sodium hydroxide solution was added to the chain silica sol to adjust the pH to 10. The sol was then concentrated with an ultrafiltration cleaning membrane (SIP-1013 manufactured by Asahi Kasei Corporation) to give an alkaline chain silica sol having a solid concentration of 20% by weight. The pH of the alkaline chain silica sol was 10.0.

Preparation (7) of Silica-Based Fine Particle Water Dispersion Sol

A silica-based fine particle water dispersion sol (SW7) containing chain silica-based fine particles was prepared in the same manner as in Example 1, except that 4000 g of the alkaline silica sol (product name: CATALOID SI-40 manufactured by JGC Catalysts and Chemicals Ltd., $SiO_2$ concentration: 40% by weight, $Na_2O$ concentration: 0.40% by weight, pH: 9.5, average particle diameter: 17 nm, $Al_2O_3/SiO_2$ (molar ratio)=0.0006) used in the step (1) in Example 1 was replaced by 8000 g of the alkaline chain silica sol prepared above.

In the step (1) of this example, the alkaline silica sol and the aqueous sodium aluminate solution were mixed in a $Al_2O_3/SiO_2$ molar ratio of 0.009, and the rate of addition of the sodium aluminate was $1.5 \times 10^{-2}$ g/hr.

The silica-based fine particle water dispersion sol (SW7) had a solid concentration in terms of $SiO_2$ of 30.1% by weight, a solid concentration in terms of $Al_2O_3$ of 0.41% by weight, a solid concentration in terms of $Na_2O$ of 0.21% by weight, a $Al_2O_3/SiO_2$ molar ratio of $8.1 \times 10^{-3}$, a pH of 4.5, a haze of 1.6%, a viscosity of 16.4 mPa·s, and a viscosity after an accelerated test at 40° C. for 7 days of 16.4 mPa·s. Of the silica-based fine particles contained in the silica-based fine particle water dispersion sol, arbitrary 100 secondary particles observed in a transmission electron micrograph had an average shorter diameter of 9 nm and an average longer diameter of 27 nm, which gave an average particle diameter of 18 nm. The chain particles contained an average of 3 primary particles that were coupled together.

The specific surface area of the chain particles was 274 m²/g. The amount of modification by aluminum was $4.9 \times 10^{-7}$ mol/m² per unit specific surface area of the particles. The amount of the negative charge per unit specific surface area of the particles was 1.0 µeq/m².

When the silica-based fine particle water dispersion sol was concentrated with a rotary evaporator to a solid concentration of 50% by weight, the viscosity of the concentrate was 231 mPa·s.

Preparation (7) of Silica-Based Fine Particle Methanol Dispersion Sol

A silica-based fine particle methanol dispersion sol (SM7) was prepared in the same manner as described in Preparation (1) of silica-based fine particle methanol dispersion sol in Example 1, except that the silica-based fine particle water dispersion sol (SW1) was replaced by the silica-based fine particle water dispersion sol (SW7).

The obtained silica-based fine particle methanol dispersion sol (SM7) had a water content of approximately 0.5% by weight, a solid concentration in terms of $SiO_2$ of 30.1% by weight, a pH after diluted ten times with distilled water of 4.9, a haze of 1.8%, a viscosity of 8.2 mPa·s, and a viscosity after an accelerated test for 7 days of 8.2 mPa·s. The silica-based fine particles contained in the silica-based fine particle methanol dispersion sol had an average shorter diameter of 9 nm and an average longer diameter of 27 nm, which gave an average particle diameter of 18 nm. The chain particles contained an average of 3 primary particles that were coupled together.

The specific surface area of the chain particles was 274 $m^2/g$. The amount of modification by aluminum was $4.9 \times 10^{-7}$ $mol/m^2$ per unit specific surface area of the particles. The amount of the negative charge per unit specific surface area of the particles was 1.0 $\mu eq/m^2$.

Preparation of Coating Composition (H7) for Forming Hardcoat Layer

A hardcoat coating composition (H7) was prepared in the same manner as described in Preparation of coating composition (H1) for forming hardcoat layer in Example 1, except that the silica-based fine particle water dispersion sol (SW1) was replaced by the silica-based fine particle water dispersion sol (SW7).

Example 8

Preparation (8) of Silica-Based Fine Particle Water Dispersion Sol

A silica-based fine particle water dispersion sol (SW8) was prepared in the same manner as in Example 1, except that the pH of the alkaline silica-based fine particle water dispersion sol was adjusted to 5.0 with the cation exchange resin in the step (3) instead of pH 3.5 in Example 1.

The silica-based fine particle water dispersion sol (SW8) had a $SiO_2$ concentration of 29.59% by weight, a $Al_2O_3$ concentration of 0.44% by weight, a $Na_2O$ concentration of 0.27% by weight, a $Al_2O_3/SiO_2$ molar ratio of $88 \times 10^{-4}$, a pH of 5.6, a haze of 2.6%, a viscosity of 3.8 mPa·s, and a viscosity after an accelerated test at 40° C. for 7 days of 3.9 mPa·s. The average particle diameter and the specific surface area of the silica-based fine particles contained in the silica-based fine particle water dispersion sol were 16.7 nm and 163 $m^2/g$. The amount of the negative charge was 0.75 $\mu eq/m^2$ per unit surface area of the particles. The amount of modification by aluminum was $0.88 \times 10^{-6}$ $mol/m^2$ per unit surface area of the particles.

When the silica-based fine particle water dispersion sol was concentrated with a rotary evaporator to a solid concentration of 50% by weight, the viscosity of the concentrate was 92 mPa·s.

Preparation (8) of Silica-Based Fine Particle Methanol Dispersion Sol

A silica-based fine particle methanol dispersion sol (SM8) was prepared in the same manner as described in Preparation (1) of silica-based fine particle methanol dispersion sol in Example 1, except that the silica-based fine particle water dispersion sol (SW1) was replaced by the silica-based fine particle water dispersion sol (SW8).

The obtained silica-based fine particle methanol dispersion sol (SM8) had a water content of approximately 0.5% by weight, a solid concentration in terms of $SiO_2$ of 29.59% by weight, a pH after diluted ten times with distilled water of 5.8, a haze of 2.1%, a viscosity of 1.6 mPa·s, and a viscosity after an accelerated test for 7 days of 1.6 mPa·s. The average particle diameter and the specific surface area of the silica-based fine particles contained in the silica-based fine particle methanol dispersion sol were 16.7 nm and 163 $m^2/g$. The amount of modification by aluminum in terms of $Al_2O_3$ was $0.88 \times 10^{-6}$ $mol/m^2$ per unit surface area of the silica-based fine particles. The amount of the negative charge on the surface of the silica-based fine particles was 0.75 $\mu eq/m^2$.

Preparation of Coating Composition (H8) for Forming Hardcoat Layer

A hardcoat coating composition (H8) was prepared in the same manner as described in Preparation of coating composition (H1) for forming hardcoat layer in Example 1, except that the silica-based fine particle water dispersion sol (SW1) was replaced by the silica-based fine particle water dispersion sol (SW8).

Example 9

Preparation (9) of Silica-Based Fine Particle Water Dispersion Sol

Step (1)

The procedures in the step (1) in Example 1 were repeated to prepare a mixture solution of an alkaline silica sol and an aqueous sodium aluminate solution.

Step (2)

The mixture solution of the alkaline silica sol and the aqueous sodium aluminate solution obtained in the step (1) was heat treated at 95° C. for 6.0 hours while performing stirring. Thus, an alkaline silica-based fine particle water dispersion sol was obtained.

Step (3)

The alkaline silica-based fine particle water dispersion sol obtained in the above step was cooled to room temperature and was mixed with a cation exchange resin (DIAION SK1BH manufactured by Mitsubishi Chemical Corporation) so as to adjust the pH to 3.5. Without removing the resin, the sol was aged for 7 hours while performing stirring at a constant temperature of 80° C. Thereafter, the cation exchange resin was separated and removed, thereby obtaining a silica-based fine particle water dispersion sol having a solid concentration in terms of $SiO_2$ of 29.33% by weight, a viscosity of 1.98 mPa·s, and a pH of 4.9.

The silica-based fine particle water dispersion sol was concentrated with an ultrafiltration membrane to give 5400 g of a silica-based fine particle water dispersion sol (SW9) having a solid concentration of 30% by weight. The silica-based fine particle water dispersion sol had a $SiO_2$ concentration of 29.33% by weight, a $Al_2O_3$ concentration of 0.41% by weight, a $Na_2O$ concentration of 0.24% by weight, a $Al_2O_3/SiO_2$ molar ratio of $82 \times 10^{-4}$, a pH of 4.7, a haze of 2.6%, a viscosity of 3.4 mPa·s, and a viscosity after an accelerated test at 40° C. for 7 days of 3.4 mPa·s. The average particle diameter and the specific surface area of the silica-based fine particles contained in the silica-based fine particle water dispersion sol were 16.8 nm and 162 m$^2$/g. The amount of the surface negative charge per unit surface area of the particles was 0.75 μeq/m$^2$. The amount of modification by aluminum was 0.83×10$^{-6}$ mol/m$^2$ per unit surface area of the particles.

When the silica-based fine particle water dispersion sol was concentrated with a rotary evaporator to a solid concentration of 50% by weight, the viscosity of the concentrate was 83 mPa·s.

Preparation (9) of Silica-Based Fine Particle Methanol Dispersion Sol

A silica-based fine particle methanol dispersion sol (SM9) was prepared in the same manner as described in Preparation (1) of silica-based fine particle methanol dispersion sol in Example 1, except that the silica-based fine particle water dispersion sol (SW1) was replaced by the silica-based fine particle water dispersion sol (SW9).

The obtained silica-based fine particle methanol dispersion sol (SM9) had a water content of approximately 0.5% by weight, a solid concentration in terms of SiO$_2$ of 29.53% by weight, a pH after diluted ten times with distilled water of 5.2, a haze of 2.2%, a viscosity of 1.5 mPa·s, and a viscosity after an accelerated test for 7 days of 1.5 mPa·s. The average particle diameter and the specific surface area of the silica-based fine particles contained in the silica-based fine particle methanol dispersion sol were 16.8 nm and 162 m$^2$/g. The amount of modification by aluminum was 0.83×10$^{-6}$ mol/m$^2$ per unit surface area of the particles. The amount of the negative charge was 0.75 μeq/m$^2$ per unit surface area of the particles.

Preparation of Coating Composition (H9) for Forming Hardcoat Layer

A hardcoat coating composition (H9) was prepared in the same manner as described in Preparation of coating composition (1) for forming hardcoat layer in Example 1, except that the silica-based fine particle water dispersion sol (SW1) was replaced by the silica-based fine particle water dispersion sol (SW9).

Comparative Example 1

Preparation (10) of Silica-Based Fine Particle Water Dispersion Sol

A silica-based fine particle water dispersion sol (RSW1) having a solid concentration of 30% by weight was prepared in the same manner as in Example 1, except that the amount of the aqueous sodium aluminate solution (concentration: 0.9% by weight) was changed from 2712 g in the step (1) in Example 1 to 61400 g. In the addition of the aqueous sodium aluminate solution to the alkaline silica sol in the step (1), the Al$_2$O$_3$/SiO$_2$ molar ratio was 0.2.

The silica-based fine particle water dispersion sol had a SiO$_2$ concentration of 27.47% by weight, a Al$_2$O$_3$ concentration of 2.12% by weight, a Na$_2$O concentration of 0.71% by weight, a Al$_2$O$_3$/SiO$_2$ molar ratio of 480×10$^{-4}$, a pH of 6.3, a haze of 35.5%, a viscosity of 23.1 mPa·s, and a viscosity after an accelerated test at 40° C. for 7 days of 60.9 mPa·s.

The average particle diameter and the specific surface area of the silica-based fine particles contained in the silica-based fine particle water dispersion sol were 17.4 nm and 157 m$^2$/g. The amount of the negative charge was 1.3 μeq/m$^2$ per unit surface area of the particles. The amount of modification by aluminum was 7.4×10$^{-6}$ mol/m$^2$ per unit surface area of the particles.

Gelation resulted when an attempt was made to concentrate the silica-based fine particle water dispersion sol with a rotary evaporator to a solid concentration of 50% by weight.

Preparation (10) of Silica-Based Fine Particle Methanol Dispersion Sol

In an attempt to prepare a silica-based fine particle methanol dispersion sol (RSM1), the procedures described in Preparation (1) of silica-based fine particle methanol dispersion sol in Example 1 were repeated except that the silica-based fine particle water dispersion sol (SW1) was replaced by the silica-based fine particle water dispersion sol (RSW1). However, the attempt resulted in gelation.

Preparation of Coating Composition (C1) for Forming Hardcoat Layer

A hardcoat coating composition (C1) was prepared in the same manner as described in Preparation of coating composition (H1) for forming hardcoat layer in Example 1, except that the silica-based fine particle water dispersion sol (SW1) was replaced by the silica-based fine particle water dispersion sol (RSW1).

Comparative Example 2

Preparation (11) of Silica-Based Fine Particle Water Dispersion Sol

In an attempt to prepare a silica-based fine particle water dispersion sol (RSW2) having a solid concentration of 30% by weight, the procedures in Example 1 were repeated except that the amount of the aqueous sodium aluminate solution (concentration: 0.9% by weight) was changed from 2712 g in the step (1) in Example 1 to 611 g. However, the attempt resulted in gelation.

In the addition of the aqueous sodium aluminate solution to the alkaline silica sol in the step (1), the Al$_2$O$_3$/SiO$_2$ molar ratio was 0.002.

Because the silica-based fine particle water dispersion sol had been gelled, the solvent substitution with an organic solvent and the preparation of a coating composition were cancelled.

Comparative Example 3

Preparation (12) of Silica-Based Fine Particle Water Dispersion Sol

A mixture solution was prepared in the same manner as in the step (1) in Example 1. The mixture solution was heated to 0.40° C. while performing stirring, and was further stirred for 6.0 hours while maintaining the temperature constant.

The pH of the mixture solution was adjusted to 9 in the same manner as in the step (1.2) in Example 1. Thereafter, the resin was separated and removed from the mixture solution, and the solution was heat treated in an autoclave at 40° C. for 1 hour to give an alkaline silica-based fine particle water dispersion sol.

The sol was treated in the same manner as described in the step (3) in Example, except that the temperature was changed from 80° C. to 40° C. Thus, a silica-based fine particle water dispersion sol (RSW3) was prepared.

The silica-based fine particle water dispersion sol had a SiO$_2$ concentration of 29.96% by weight, a Al$_2$O$_3$ concentration of 0.02% by weight, a Na$_2$O concentration of 0.11% by weight, a $Al_2O_3/SiO_2$ molar ratio of $3.92\times10^{-4}$, a pH of 4.5, a haze of 18.0%, a viscosity of 16.8 mPa·s, and a viscosity after an accelerated test at 40° C. for 7 days of 34.8 mPa·s. The silica-based fine particles contained in the silica-based fine particle water dispersion sol had an average particle diameter of 16.7 nm and a specific surface area of 163 m$^2$/g. The amount of the negative charge per unit surface area of the particles was 0.2 μeq/m$^2$. The amount of modification by aluminum was $0.04\times10^{-6}$ mol/m$^2$ per unit surface area of the particles.

An attempt was made to concentrate the silica-based fine particle water dispersion sol with a rotary evaporator to a solid concentration of 50% by weight. However, gelation occurred at a concentration of 32% by weight.

Preparation (12) of Silica-Based Fine Particle Methanol Dispersion Sol

A silica-based fine particle methanol dispersion sol (RSM3) was prepared in the same manner as in Example 1, except that the silica-based fine particle water dispersion sol (SW1) was replaced by the silica-based fine particle water dispersion sol (RSW3). The water content was approximately 0.5% by weight.

The obtained silica-based fine particle methanol dispersion sol had a solid concentration in terms of $SiO_2$ of 29.66% by weight, a pH after diluted ten times with distilled water of 4.8, a haze of 17.3%, a viscosity of 10.4 mPa·s, and a viscosity after an accelerated test for 7 days of 42.1 mPa·s. The average particle diameter and the specific surface area of the silica-based fine particles contained in the silica-based fine particle methanol dispersion sol were 16.7 nm and 163 m$^2$/g. The amount of modification by aluminum was $0.86\times10^{-6}$ mol/m$^2$ per unit specific surface area of the particles. The amount of the negative charge was 0.8 μeq/m$^2$ per unit specific surface area of the particles.

Preparation of Coating Composition (C3) for Forming Hardcoat Layer

A hardcoat coating composition (C3) was prepared in the same manner as described in Preparation of coating composition (H1) for forming hardcoat layer in Example 1, except that the silica-based fine particle water dispersion sol (SW1) was replaced by the silica-based fine particle water dispersion sol (RSW3).

Comparative Example 4

Preparation (13) of Silica-Based Fine Particle Water Dispersion Sol

A silica-based fine particle water dispersion sol (RSW4) was prepared in the same manner as in Example 1, except that the pH in the step (3) was adjusted to 2.0 instead of pH 3.5 in Example 1.

The silica-based fine particle water dispersion sol had a $SiO_2$ concentration of 30.27% by weight, a $Al_2O_3$ concentration of 0.08% by weight, a $Na_2O$ concentration of 0.05% by weight, a $Al_2O_3/SiO_2$ molar ratio of $16\times10^{-4}$, a pH of 2.2, a haze of 1.9%, a viscosity of 3.6 mPa·s, and a viscosity after an accelerated test at 40° C. for 7 days of 19.3 mPa·s. The silica-based fine particles contained in the silica-based fine particle water dispersion sol had an average particle diameter of 16.6 nm and a specific surface area of 164 m$^2$/g. The amount of the negative charge per unit specific surface area of the particles was 0.24 μeq/m$^2$. The amount of modification by aluminum was $0.16\times10^{-6}$ mol/m$^2$ per unit specific surface area of the particles.

An attempt was made to concentrate the silica-based fine particle water dispersion sol with a rotary evaporator to a solid concentration of 50% by weight. However, the attempt resulted in gelation.

Preparation (13) of Silica-Based Fine Particle Methanol Dispersion Sol

A silica-based fine particle methanol dispersion sol (RSM4) was prepared in the same manner as in Example 1, except that the silica-based fine particle water dispersion sol (SW1) was replaced by the silica-based fine particle water dispersion sol (RSW4). The water content was approximately 0.5% by weight.

The obtained silica-based fine particle organic solvent dispersion sol had a solid concentration in terms of $SiO_2$ of 30.27% by weight, a pH after diluted ten times with distilled water of 2.4, a haze of 1.5%, a viscosity of 2.1 mPa·s, and a viscosity after an accelerated test for 7 days of 12.1 mPa·s. The average particle diameter and the specific surface area of the silica-based fine particles contained in the silica-based fine particle methanol dispersion sol were 16.6 nm and 164 m$^2$/g. The amount of modification by aluminum was $0.16\times10^{-6}$ mol/m$^2$ per unit specific surface area of the particles. The amount of the negative charge was 0.24 μeq/m$^2$ per unit specific surface area of the particles.

Preparation of Coating Composition (C4) for Forming Hardcoat Layer

A hardcoat coating composition (C4) was prepared in the same manner as described in Preparation of coating composition (H1) for forming hardcoat layer in Example 1, except that the silica-based fine particle water dispersion sol (SW1) was replaced by the silica-based fine particle water dispersion sol (RSW4).

Comparative Example 5

Preparation (14) of Silica-Based Fine Particle Water Dispersion Sol

A silica-based fine particle water dispersion sol (RSW5) was prepared in the same manner as described in Preparation (1) of silica-based fine particle water dispersion sol in Example 1, except that the pH in the step (3) was adjusted to 8.0 instead of pH 3.5 in Example 1.

The silica-based fine particle water dispersion sol had a $SiO_2$ concentration of 28.70% by weight, a $Al_2O_3$ concentration of 0.45% by weight, a $Na_2O$ concentration of 0.95% by weight, a $Al_2O_3/SiO_2$ molar ratio of $92\times10^{-4}$, a pH of 8.3, a haze of 3.3%, a viscosity of 5.2 mPa·s, and a viscosity after an accelerated test at 40° C. for 7 days of 5.3 mPa·s. The silica-based fine particles contained in the silica-based fine particle water dispersion sol had an average particle diameter of 16.9 nm and a specific surface area of 161 m$^2$/g. The amount of the negative charge per unit specific surface area of the particles was 1.2 μeq/m$^2$. The amount of modification by aluminum was $0.94\times10^{-6}$ mol/m$^2$ per unit specific surface area of the particles.

An attempt was made to concentrate the silica-based fine particle water dispersion sol with a rotary evaporator to a solid concentration of 50% by weight. However, the attempt resulted in gelation.

Preparation (14) of Silica-Based Fine Particle Organic Solvent Dispersion Sol

In an attempt to prepare a silica-based fine particle methanol dispersion sol (RSM5), the procedures in Example 1 were repeated except that the silica-based fine particle water dispersion sol (SW1) was replaced by the silica-based fine particle water dispersion sol (RSW5). However, the attempt resulted in gelation.

Preparation of Coating Composition (C5) for Forming Hardcoat Layer

A hardcoat coating composition (C5) was prepared in the same manner as in Example 1, except that the silica-based fine particle water dispersion sol (SW1) was replaced by the silica-based fine particle water dispersion sol (RSW5).

Comparative Example 6

Preparation (15) of Silica-Based Fine Particle Water Dispersion Sol

The procedures described in Preparation (1) of silica-based fine particle water dispersion sol in Example 1 were repeated, except that 4000 g of the alkaline silica sol used in the step (1) in Example 1 was replaced by 10711 g of a silica sol (manufactured by JGC Catalysts and Chemicals Ltd., $SiO_2$ concentration: 15.2% by weight, $Na_2O$ concentration: 0.38% by weight, pH 11, average particle diameter: 3 nm). Thus, there was obtained a silica-based fine particle water dispersion sol having a solid concentration in terms of $SiO_2$ of 24.2% by weight and a pH of 4.9. An attempt was made to concentrate the silica-based fine particle water dispersion sol with an ultrafiltration membrane to a solid concentration of 30% by weight. However, the attempt resulted in gelation.

Because the silica-based fine particle water dispersion sol had been gelled at a solid concentration of 30% by weight, the preparation of a silica-based fine particle organic solvent dispersion sol and the preparation of a hardcoat coating composition were cancelled.

Comparative Example 7

Preparation (16) of Silica-Based Fine Particle Water Dispersion Sol

A silica-based fine particle water dispersion sol (RSW7) was prepared in the same manner as in Example 1, except that 2712 g of the 0.9% by weight aqueous sodium aluminate solution was added at a constant rate in 1 minute instead of 1 hour in the step (1) in Example 1.

At this time, the rate of addition of the aqueous sodium aluminate solution was $88.2 \times 10^{-2}$ g/hr.

The silica-based fine particle water dispersion sol had a $SiO_2$ concentration of 29.50% by weight, a $Al_2O_3$ concentration of 0.44% by weight, a $Na_2O$ concentration of 0.26% by weight, a $Al_2O_3/SiO_2$ molar ratio of $88 \times 10^{-4}$, a pH of 3.4, a haze of 19.0%, a viscosity of 3.6 mPa·s, and a viscosity after an accelerated test at 40° C. for 7 days of 25.1 mPa·s. The silica-based fine particles contained in the silica-based fine particle water dispersion sol had an average particle diameter of 17.2 nm and a specific surface area of 159 m²/g. The amount of the negative charge per unit specific surface area of the particles was 0.29 μeq/m². The amount of modification by aluminum was $0.88 \times 10^{-6}$ mol/m² per unit specific surface area of the particles.

An attempt was made to concentrate the silica-based fine particle water dispersion sol with a rotary evaporator to a solid concentration of 50% by weight. However, the attempt resulted in gelation.

Preparation (16) of Silica-Based Fine Particle Organic Solvent Dispersion Sol

A silica-based fine particle methanol dispersion sol (RSM7) was prepared in the same manner as in Example 1, except that the silica-based fine particle water dispersion sol (SW1) was replaced by the silica-based fine particle water dispersion sol (RSW7). The water content was approximately 0.5% by weight.

The obtained silica-based fine particle methanol dispersion sol had a solid concentration in terms of $SiO_2$ of 29.50% by weight, a pH after diluted ten times with distilled water of 3.6, a haze of 12.9%, and a viscosity of 1.8. An accelerated test for 7 days with respect to viscosity resulted in gelation, and thus the measurement of the viscosity was impossible. The average particle diameter and the specific surface area of the silica-based fine particles contained in the silica-based fine particle methanol dispersion sol were 17.2 nm and 159 m²/g. The amount of modification by aluminum was $0.88 \times 10^{-6}$ mol/m² per unit specific surface area of the particles. The amount of the negative charge was 0.29 μeq/m² per unit specific surface area of the particles.

Preparation of Coating Composition (C7) for Forming Hardcoat Layer

A hardcoat coating composition (C7) was prepared in the same manner as in Example 1, except that the silica-based fine particle water dispersion sol (SW1) was replaced by the silica-based fine particle water dispersion sol (RSW7).

Table 1 describes the properties of the silica-based fine particle water dispersion sols (solid concentration: 30% by weight) and the silica-based fine particles prepared in Examples 1 to 9 and Comparative Examples 1 to 7.

The results show that the silica-based fine particle water dispersion sols prepared in Examples had a low and highly stable viscosity as well as high transparency.

TABLE 1

| | Properties of silica-based fine particle water dispersion sols | | | | Properties of silica-based fine particles | |
|---|---|---|---|---|---|---|
| | | | Viscosity (mPa · s) | | | |
| | pH | Haze (%) | Before accelerated test | After accelerated test | Amount of negative charge (μeq/m²) | Amount of modification by Al per unit surface area ($Al_2O_3$ mol/m²) |
| Example 1 | 4.8 | 2.5 | 3.5 | 3.5 | 0.9 | $0.85 \times 10^{-6}$ |
| Example 2 | 3.9 | 2.7 | 3.2 | 3.3 | 0.61 | $0.28 \times 10^{-6}$ |
| Example 3 | 5.1 | 4.1 | 8.7 | 8.9 | 0.96 | $1.6 \times 10^{-6}$ |
| Example 4 | 4.5 | 4.3 | 8.6 | 8.6 | 0.76 | $0.84 \times 10^{-6}$ |
| Example 5 | 4.9 | 2.1 | 15.1 | 15.3 | 0.69 | $0.37 \times 10^{-6}$ |
| Example 6 | 4.6 | 11.5 | 3.0 | 3.1 | 0.87 | $1.2 \times 10^{-6}$ |
| Example 7 | 4.5 | 1.6 | 16.4 | 16.4 | 1.0 | $0.49 \times 10^{-6}$ |
| Example 8 | 5.6 | 2.6 | 3.8 | 3.9 | 0.75 | $0.88 \times 10^{-6}$ |
| Example 9 | 4.7 | 2.6 | 3.4 | 3.4 | 0.88 | $0.83 \times 10^{-6}$ |

TABLE 1-continued

| | | | Properties of silica-based fine particle water dispersion sols | | Properties of silica-based fine particles | |
|---|---|---|---|---|---|---|
| | | | Viscosity (mPa·s) | | | |
| | pH | Haze (%) | Before accelerated test | After accelerated test | Amount of negative charge ($\mu eq/m^2$) | Amount of modification by Al per unit surface area ($Al_2O_3$ $mol/m^2$) |
| Comparative Example 1 | 6.3 | 35.5 | 23.1 | 60.9 | 1.3 | $7.4 \times 10^{-6}$ |
| Comparative Example 2 | | | | | Gelation | |
| Comparative Example 3 | 4.5 | 18.0 | 16.8 | 34.8 | 0.2 | $0.04 \times 10^{-6}$ |
| Comparative Example 4 | 2.2 | 1.9 | 3.6 | 19.3 | 0.24 | $0.16 \times 10^{-6}$ |
| Comparative Example 5 | 8.3 | 3.3 | 5.2 | 5.3 | 1.2 | $0.94 \times 10^{-6}$ |
| Comparative Example 6 | | | | | Gelation | |
| Comparative Example 7 | 3.4 | 19.0 | 3.6 | 25.1 | 0.29 | $0.91 \times 10^{-6}$ |

Preparation of Coating Composition for Forming Primer Coat Layer

Preparation Example 1

Preparation of Coating Composition 200 g of a commercial water-dispersed polyurethane resin (SUPER FLEX 460 manufactured by DAI-ICHI KOGYO SEIYAKU CO., LTD., solid concentration: 38%) was mixed with 100 g of pure water. While stirring the mixture, 500 g of methanol and 2 g of a silicone surfactant (L-7604 manufactured by Dow Corning Toray Co., Ltd.) as a leveling agent were added. The resultant mixture was stirred at room temperature for one day to give a coating composition for forming a primer coat layer (hereinafter, referred to as "primer coating composition").

Preparation of Test Pieces

Preparation Example 2

Pretreatment of Plastic Lens Substrates

A desired number of commercial plastic lens substrates CR-39 (using a monomer manufactured by PPG) were provided. The substrates were etched by being soaked for 3 minutes in a 10% by weight aqueous KOH solution that had been maintained at 40° C. Further, the substrates were collected, washed with water and sufficiently dried.

Formation of Primer Layers

According to the combinations shown in Table 2, the resulted plastic lens substrates were coated with the primer coating composition. The primer coating composition was applied by dipping the substrate into the composition (pick up rate: 100 mm/min).

Subsequently, the wet film of the primer was heat treated at 100° C. for 10 minutes to preliminarily cure the film (the primer layer).

The primer layers formed by the preliminary curing generally had a thickness of 0.5

Formation of Hardcoat Layers

According to the combinations shown in Table 2, the hardcoat coating compositions (H1 to H9 obtained in Examples 1 to 9, and C1 to C7 obtained in Comparative Examples 1 to 7) were each applied to the surface of the plastic lens substrate or the primer coat layer to form a coating film. The coating composition was applied by a dipping method (pick up rate: 230 ram/min).

Subsequently, the wet film of the coating composition was dried at 100° C. for 10 minutes and was heat treated at 100° C. for 2 hours, thereby curing the coating layer (the hardcoat layer). At this time, the primer layer was simultaneously cured.

The hardcoat layers that had been cured according to the above-mentioned procedure had a thickness of 3.0 to 3.5 μm.

Formation of Antireflective Layers

According to the combinations shown in Table 2, the inorganic oxide components described below were deposited by a vacuum deposition method on the surface of the cured hardcoat layer. In this manner, an antireflective layer was formed in which $SiO_2$: 0.06λ, $ZrO_2$: 0.15λ, $SiO_2$: 0.04λ, $ZrO_2$: 0.25λ, and $SiO_2$: 0.25λ were stacked on top of one another in this order from the hardcoat layer side toward the atmosphere side. The design wavelength λ was 520 nm.

With respect to the test pieces 1 to 18 obtained as described above, the film hardness, the scratch resistance, the transparency (the degree of cloudiness), the adhesion, the heat resistance and the impact resistance were evaluated by the aforementioned methods, the results being shown in Table 3.

The results demonstrated that the test pieces that had been prepared by applying the coating composition of Example showed high transparency without cloudiness, as well as high film hardness and scratch resistance. Further, these test pieces were also excellent in adhesion, heat resistance and impact resistance.

TABLE 2

| Test piece No. | Formation of primer layer | Formation of hardcoat layer and used hardcoat coating composition | | Formation of antireflective layer |
|---|---|---|---|---|
| | | Example | Comparative Example | |
| 1 | No | H1 | — | No |
| 2 | No | H2 | — | No |
| 3 | No | H3 | — | No |
| 4 | No | H4 | — | No |
| 5 | No | H5 | — | No |

TABLE 2-continued

| Test piece No. | Formation of primer layer | Formation of hardcoat layer and used hardcoat coating composition | | Formation of antireflective layer |
|---|---|---|---|---|
| | | Example | Comparative Example | |
| 6 | No | H6 | — | No |
| 7 | No | H7 | — | No |
| 8 | No | H8 | — | No |
| 9 | No | H9 | — | No |
| 10 | No | H1 | — | Yes |
| 11 | Yes | H1 | — | Yes |
| 12 | No | — | C1 | No |
| 13 | No | — | C3 | No |
| 14 | No | — | C4 | No |
| 15 | No | — | C5 | No |
| 16 | No | — | C7 | No |
| 17 | No | — | C1 | Yes |
| 18 | Yes | — | C1 | Yes |

TABLE 3

| Test piece No. | Film hardness (Bayer value) | Scratch resistance | Transparency (degree of cloudiness) | Adhesion | Heat resistance (adhesion) | Impact resistance (presence or absence of cracks) |
|---|---|---|---|---|---|---|
| 1 | 3.5 | B | A | Good | Good | Present |
| 2 | 3.0 | B | A | Good | Good | Present |
| 3 | 3.5 | B | A | Good | Good | Present |
| 4 | 3.3 | B | A | Good | Good | Present |
| 5 | 3.4 | B | A | Good | Good | Present |
| 6 | 2.8 | B | A | Good | Good | Present |
| 7 | 4.2 | A | A | Good | Good | Present |
| 8 | 3.1 | B | A | Good | Good | Present |
| 9 | 3.3 | B | A | Good | Good | Present |
| 10 | 8.9 | A | A | Good | Good | Present |
| 11 | 9.0 | A | A | Good | Good | Absent |
| 12 | 1.1 | D | C | Good | Bad | Present |
| 13 | 1.8 | C | B | Good | Good | Present |
| 14 | 1.9 | C | A | Good | Good | Present |
| 15 | 1.0 | D | C | Good | Good | Present |
| 16 | 2.0 | C | B | Good | Bad | Present |
| 17 | 3.5 | B | C | Good | Good | Present |
| 18 | 3.4 | B | C | Good | Good | Absent |

The invention claimed is:

1. A coating composition which comprises:
(A) a silica-based fine particle dispersion sol comprising silica-based fine particles having a negative charge on the surface and having a pH in an acidic region from 3.0 to 6.0, wherein the silica-based fine particles are chain particles having an average particle diameter in the range of 5 to 50 nm as calculated by the equation (L+D)/2 wherein L is a longitudinal length and D is a lateral length measured with respect to a transmission electron micrograph, and the surface of the silica-based fine particles, which has been modified with aluminum, comprises a composite oxide of silica-alumina and the amount of the modification by aluminum is in the range of $0.05 \times 10^{-6}$ to $2.0 \times 10^{-6}$ mol/m$^2$ in terms of $Al_2O_3$ per unit surface area of the silica-based fine particle; and
(B) a binder component.

2. The coating composition according to claim 1, wherein the binder component is an organosilicon compound represented by Formula (II) below and/or a hydrolysate thereof:

$$R^1_a R^2_b Si(OR^3)_{4-(a+b)} \quad \text{(II)}$$

(wherein $R^1$ is a $C_{1-6}$ alkyl group, a $C_8$ or lower organic group having a vinyl group, a $C_8$ or lower organic group having an epoxy group, a $C_8$ or lower organic group having a methacryloxy group, a $C_{1-5}$ organic group having a mercapto group, or a $C_{1-5}$ organic group having an amino group; $R^2$ is a $C_{1-3}$ alkyl, alkylene, cycloalkyl, halogenated alkyl or allyl group; $R^3$ is a $C_{1-3}$ alkyl, alkylene or cycloalkyl group; a is an integer of 0 or 1; and b is an integer of 0, 1 or 2).

3. The coating composition according to claim 1, wherein the binder component is a thermosetting organic resin or a thermoplastic organic resin.

4. The coating composition according to claim 3, wherein the thermosetting organic resin is at least one selected from urethane resins, epoxy resins and melamine resins.

5. The coating composition according to claim 3, wherein the thermoplastic organic resin is at least one selected from acrylic resins, urethane resins and ester resins.

6. The coating composition according to claim 1, wherein the coating composition is an optical substrate coating composition.

7. The coating composition according to claim 6, wherein the optical substrate coating composition is a coating composition for forming a hardcoat layer.

8. A curable coating film which is obtained by applying the coating composition described in claim 1 onto a substrate.

9. A substrate having a curable coating film, which is obtained by providing the curable coating film described in claim 8 on a substrate.

* * * * *